(12) United States Patent
Ciesielski

(10) Patent No.: US 11,796,223 B2
(45) Date of Patent: *Oct. 24, 2023

(54) SYSTEM FOR PREVENTING OVERHEATING IN AIRCRAFT GALLEY INSERTS

(71) Applicant: Koninklijke Fabriek Inventum B.V., Nieuwegein (NL)

(72) Inventor: Filip Ciesielski, Nieuwegein (NL)

(73) Assignee: B/E Aerospace, Inc., Winston-Salem, NC (US)

(*) Notice: Subject to any disclaimer, the term of this patent is extended or adjusted under 35 U.S.C. 154(b) by 502 days.

This patent is subject to a terminal disclaimer.

(21) Appl. No.: 17/021,904

(22) Filed: Sep. 15, 2020

(65) Prior Publication Data

US 2022/0082299 A1 Mar. 17, 2022

(51) Int. Cl.
*F24H 9/1818* (2022.01)
*A23L 5/00* (2016.01)
*B64D 11/04* (2006.01)

(52) U.S. Cl.
CPC .............. *F24H 9/1818* (2013.01); *A23L 5/00* (2016.08); *B64D 11/04* (2013.01); *A23V 2002/00* (2013.01)

(58) Field of Classification Search
CPC ......... F24H 9/1818; A23L 5/00; B64D 11/04; A23V 2002/00

(Continued)

(56) References Cited

U.S. PATENT DOCUMENTS 3,892,946 A 7/1975 Rimmi
4,458,140 A * 7/1984 Belinkoff ............... H05B 6/68
219/494

(Continued)

FOREIGN PATENT DOCUMENTS

EP 0380369 A1 8/1990
EP 1103209 A1 5/2001

(Continued)

OTHER PUBLICATIONS

U.S. Appl. No. 17/021,854, filed Sep. 15, 2020, Filip Ciesielski.

(Continued)

*Primary Examiner* — Eric S Stapleton
(74) *Attorney, Agent, or Firm* — Suiter Swantz pc llo

(57) ABSTRACT

A system may include a heating element configured to heat a fluid, the fluid configured to heat a food or drink product. The system may include one or more fluid temperature monitoring components configured to monitor a temperature of the fluid while the fluid is heated by the heating element and configured to control the fluid temperature by controlling the heating element. The system may include one or more control units configured to control operation of an aircraft galley insert via one or more control signals. The system may include one or more heating element temperature rise slope limiters configured to maintain a heating temperature rise speed below a select heating temperature rise speed limit. The system may include one or more heating element temperature monitoring components configured to provide information of a heating element temperature to the one or more heating element temperature rise slope limiters.

11 Claims, 13 Drawing Sheets

(58) Field of Classification Search
USPC .......................................................... 392/311
See application file for complete search history.

(56) References Cited

U.S. PATENT DOCUMENTS

| | | | |
|---|---|---|---|
| 7,117,825 B2 | 10/2006 | Phillips | |
| 7,593,789 B2 | 9/2009 | Gougerot et al. | |
| 8,538,597 B2 | 9/2013 | Beckley et al. | |
| 8,642,928 B2* | 2/2014 | Schulte | H05B 6/6485 219/400 |
| 8,692,162 B2* | 4/2014 | Elston | H05B 1/02 99/325 |
| 8,720,217 B2* | 5/2014 | Reed | B64D 13/06 62/244 |
| 9,089,005 B2* | 7/2015 | Boedicker | H05B 1/0263 |
| 10,450,069 B2* | 10/2019 | Lu | B64D 11/04 |
| 10,582,249 B2* | 3/2020 | Kinoshita | H05B 1/0236 |
| 2003/0042361 A1* | 3/2003 | Simadiris | F25D 11/003 62/434 |
| 2004/0020371 A1* | 2/2004 | Patenotre | A47J 37/0611 99/349 |
| 2004/0089648 A1* | 5/2004 | Griffey | F24C 15/325 219/400 |
| 2005/0210910 A1* | 9/2005 | Rigney | B60H 1/00014 62/506 |
| 2008/0087039 A1* | 4/2008 | Reed | B64D 11/02 62/498 |
| 2011/0175737 A1* | 7/2011 | Pforte | G05D 23/1931 340/584 |
| 2013/0020310 A1 | 1/2013 | Hacham | |
| 2014/0367070 A1* | 12/2014 | Burd | B64D 11/0007 165/58 |
| 2015/0266353 A1* | 9/2015 | Lu | B64D 13/08 62/506 |
| 2017/0038122 A1* | 2/2017 | Lu | B64D 13/08 |
| 2017/0273142 A1 | 9/2017 | Denis et al. | |
| 2017/0367359 A1* | 12/2017 | Maxfield | A23C 9/1226 |
| 2019/0024908 A1 | 1/2019 | Chaudhry et al. | |
| 2019/0116394 A1* | 4/2019 | Kinoshita | H04N 21/8456 |
| 2019/0371570 A1* | 12/2019 | Oka | C23C 16/4586 |
| 2022/0081116 A1* | 3/2022 | Ciesielski | H05B 1/0236 |
| 2022/0082299 A1* | 3/2022 | Ciesielski | F24H 9/1818 |

FOREIGN PATENT DOCUMENTS

| | | |
|---|---|---|
| EP | 3580496 A1 | 12/2019 |
| GB | 711775 A | 7/1954 |
| GB | 721544 A | 1/1955 |
| GB | 858174 A | 1/1961 |
| GB | 1454594 A | 11/1976 |

OTHER PUBLICATIONS

Extended Search Report in European Application No. 21196958.9, dated Jan. 28, 2022, 8 pages.

Extended Search Report in European Application No. 21196965.4 dated Feb. 7, 2022, 8 pages.

* cited by examiner

SYSTEM FOR PREVENTING OVERHEATING IN AIRCRAFT GALLEY INSERTS

BACKGROUND

The operation and/or reliability of select aircraft galley inserts may be limited by a possibility the select aircraft galley inserts may overheat. The overheating of select aircraft galley inserts may cause issues from a tripping of thermal cut-offs to complete failure of the select aircraft galley inserts.

SUMMARY

A system is disclosed, in accordance with one or more embodiments of the disclosure. The system may include a heating element installed in the aircraft galley insert. The heating element may be configured to heat a fluid. The fluid may be configured to heat at least one of a food or drink product. The system may include one or more fluid temperature monitoring components installed in the aircraft galley insert. The one or more fluid temperature monitoring components may be configured to monitor a temperature of the fluid while the fluid is heated by the heating element. The one or more fluid temperature monitoring components may be configured to control the fluid temperature by controlling the heating element. The system may include one or more control units configured to control operation of an aircraft galley insert via one or more control signals. The one or more control units may include at least one of a mechanical device, an electronic device, or an electro-mechanical device. The one or more control units may include a programmable device utilizing software for one or more controlling functions performed via the one or more control signals. The system may include one or more heating element temperature rise slope limiters. The one or more heating element temperature rise slope limiters may be configured to at least one of prevent overheating of the aircraft galley insert or reduce damage to the aircraft galley insert caused by overheating of the aircraft galley insert by maintaining a rise speed of a temperature of the heating element below a select heating temperature rise speed limit. The system may include one or more heating element temperature monitoring components. The one or more heating element temperature monitoring components may be configured to provide information of a heating element temperature to the one or more heating element temperature rise slope limiters, the information including at least one of a measurement of the heating element temperature, a value based on a physical dependency on the heating element temperature, or a value based on a mathematical dependency of the heating element temperature used to generate an estimate of the heating element temperature.

In some embodiments, the one or more heating element temperature monitoring components may include one or more sensors. The one or more sensors may include at least one of one or more sensors integrated within the heating element, one or more direct-contact temperature sensors, one or more semidirect-contact temperature sensors positioned proximate to one or more heat conducting components, one or more remote sensors installed a select distance from the heating element, or a combination of the one or more direct-contact temperature sensors, the one or more semidirect-contact temperature sensors, and the one or more remote sensors.

In some embodiments, the one or more heating element temperature rise slope limiters may be integrated with at least one of the one or more control units or with the heating element.

In some embodiments, the one or more heating element temperature rise slope limiters may include a component separated from the one or more control units and the heating element.

In some embodiments, a control signal generated by the one or more heating element temperature rise slope limiters may be prioritized over a control signal generated by the one or more control units based on the fluid temperature.

In some embodiments, the select heating element temperature rise speed limit may be maintained by the one or more heating element temperature rise slope limiters. The select heating element temperature rise speed limit may be held constant during operation of the aircraft galley insert.

In some embodiments, the select heating element temperature rise speed limit may be maintained by the one or more heating element temperature rise slope limiters. The select heating element temperature rise speed limit may be adjusted during operation of the aircraft galley insert based on at least one of one or more models, one or more conditions of the aircraft galley insert, or one or more user inputs.

In some embodiments, the one or more models may include at least one of a physical model of the aircraft galley insert, a physical model of one or more components of the aircraft galley insert, a mathematical model of the aircraft galley insert, or a mathematical model of one or more components of the aircraft galley insert.

In some embodiments, the one or more conditions may include at least one of one or more physical conditions such as environmental conditions surrounding the aircraft galley insert, one or more modes or durations of operation, or one or more operating conditions of the galley insert such as initial operating conditions or boundary operating conditions.

In some embodiments, the value based on at least one of the physical dependency of the heating element temperature or the mathematical dependency of the heating element temperature being used to generate the estimate of the heating element temperature may be different from the measurement of any heating element temperature.

A system is disclosed, in accordance with one or more embodiments of the disclosure. The system may include a heating element installed in the aircraft galley insert, the heating element configured to heat a fluid. The fluid may be configured to heat at least one of a food or drink product. The system may include one or more fluid temperature monitoring components installed in the aircraft galley insert. The one or more fluid temperature monitoring components may be configured to monitor a temperature of the fluid while the fluid is heated by the heating element. The one or more fluid temperature monitoring components may be configured to control the fluid temperature by controlling the heating element. The system may include one or more control units configured to control operation of an aircraft galley insert via one or more control signals. The one or more control units may include at least one of a mechanical device, an electronic device, or an electro-mechanical device. The one or more control units may include a programmable device utilizing software for one or more controlling functions performed via the one or more control signals. The system may include one or more heating element temperature rise slope limiters. The one or more heating element temperature rise slope limiters may be configured to at least one of prevent overheating of the aircraft galley insert or reduce damage to the aircraft galley insert caused by overheating of the aircraft galley insert by maintaining a rise speed of a heating element temperature below a select heating temperature rise speed limit. The system may include one or more heating element temperature estimators. The one or more heating element temperature estimators may be configured to provide information of one or more estimated heating element temperatures to the one or more heating element temperature rise slope limiters. The one or more heating element temperature estimators may be configured to estimate the one or more heating element temperatures based on at least one of one or more models, one or more conditions of the aircraft galley insert, or one or more user inputs.

In some embodiments, the one or more models may include at least one of a physical model of the aircraft galley insert, a physical model of one or more components of the aircraft galley insert, a mathematical model of the aircraft galley insert, or a mathematical model of one or more components of the aircraft galley insert.

In some embodiments, the one or more conditions may include at least one of one or more physical conditions such as environmental conditions surrounding the aircraft galley insert, one or more modes or times of operation, or one or more operating conditions of the galley insert such as initial operating conditions or boundary operating conditions.

In some embodiments, a control signal generated by the one or more heating element temperature rise slope limiters may be prioritized over a control signal generated by the one or more control units based on the fluid temperature.

In some embodiments, the select heating element temperature rise speed limit may be maintained by the one or more heating element temperature rise slope limiters. The select heating element temperature rise speed limit may be held constant during operation of the aircraft galley insert or may be adjusted during operation of the aircraft galley insert based on at least one of one or more models, one or more conditions of the aircraft galley insert, or one or more user inputs.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1A:
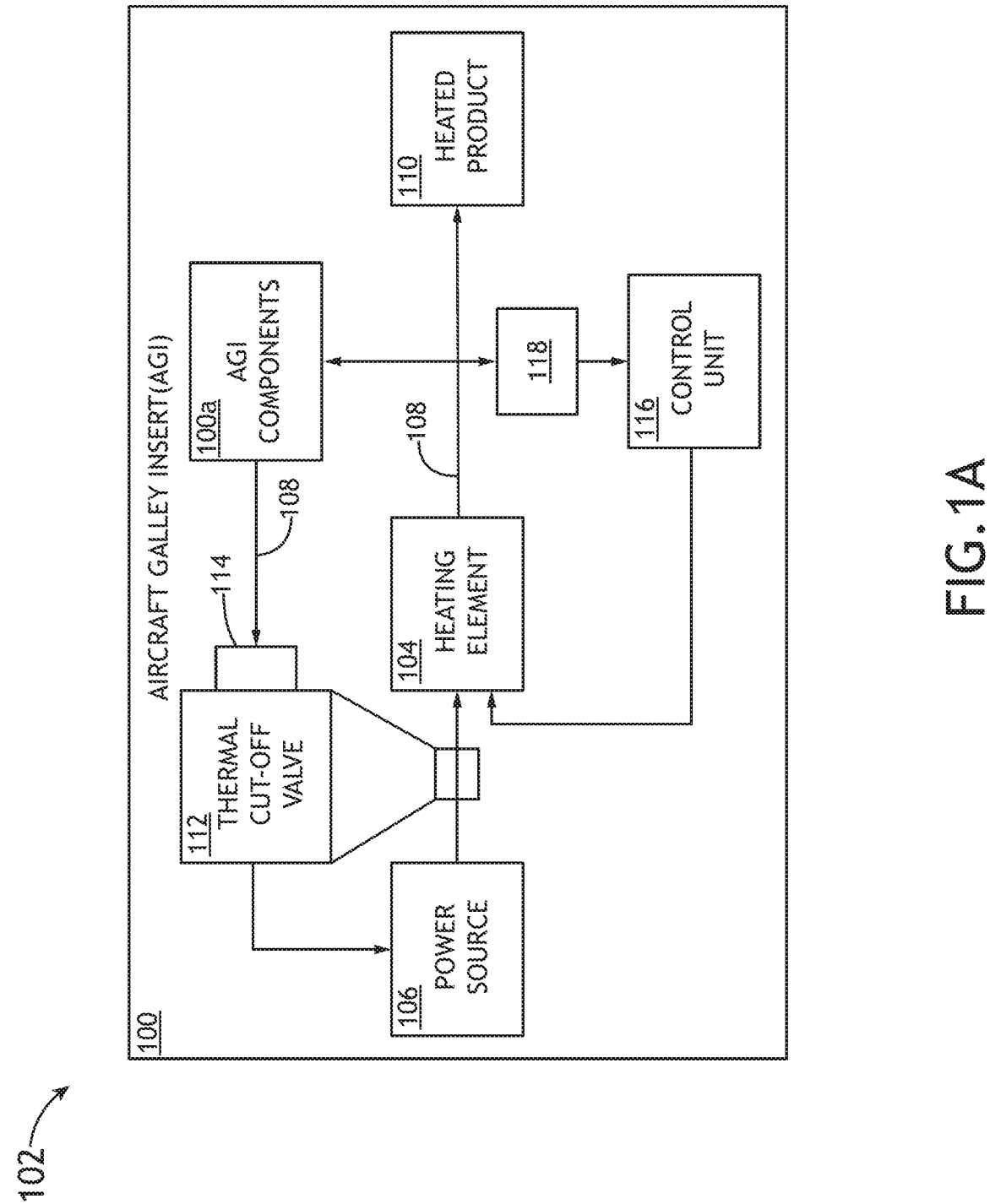
FIG. 1A is a block diagram of an aircraft galley insert architecture, in accordance with one or more embodiments of the disclosure.

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

FIGS. 1A-11 in general illustrate a system for preventing overheating in aircraft galley inserts, in accordance with one or more embodiments of the disclosure.

The operation and/or reliability of select aircraft galley inserts may be limited by a possibility that the select aircraft galley inserts may overheat. For example, aircraft galley inserts such as ovens, beverage makers, or the like may include heating elements configured to deliver heat to a food product during preparation and/or re-heating, a drink product during preparation and/or re-heating, or the like. If the select aircraft galley inserts overheat, the select aircraft galley inserts may develop issues ranging in severity from a tripping of thermal cut-offs to complete failure.

For example, an aircraft galley insert may include a thermal cut-off (TCO) that interrupts operation of the aircraft galley insert in case of a select temperature is exceeded. The TCO may be tripped incorrectly/falsely (e.g., during a heating of a thermally heavy load) or correctly (e.g., during an interrupted cycle with motor stalling and/or fluid flow partial or complete blockage). Regardless of the tripping state, a tripped TCO in general requires the aircraft galley insert to be pulled from service for repair.

By way of another example, an interior surface, subsystem, or subcomponent of the subsystem of an aircraft galley insert may discolor when exposed to high temperatures. For instance, the high temperature may be greater than 225° C. (437° F.), generating heat tints.

By way of another example, food and/or drink byproducts remaining in aircraft galley insert may burn and/or catch on fire, leading to an internal foul smell and/or an internal smoke generation.

By way of another example, an interior surface, subsystem, or subcomponent of the subsystem of an aircraft galley insert may be damaged (e.g., discolor, change in shape, melt, burn, or the like) when exposed to high temperatures.

By way of another example, food and/or drink products, or adjacent galley inserts, may burn and/or catch on fire leading to an external smell and/or external smoke generation.

It is noted herein the above examples may have multiple levels of severity and/or may take different forms. In addition, it is noted herein the above examples may occur simultaneously or as a cascade effect.

It is noted herein a premature or quicker degradation of the heating element due to rarer and/or more severe overheating event may be considered an overheating-related issue. In addition, it is noted herein a premature or quicker degradation of the heating element due to repetitive (e.g., most or every cooking cycle) slight overheating operating conditions may be considered an overheating-related issue.

The select aircraft galley inserts may include safeguards within a safety loop to reduce and/or prevent an already-occurring malfunction or failure of the select aircraft galley inserts caused by the above examples. However, the select aircraft galley inserts may not address the possibility of a malfunction or failure during normal operation.

As such, it would be desirable to provide a system for preventing overheating in aircraft galley inserts. The system may be configured to monitor an aircraft galley insert during normal operation to attempt to reduce and/or prevent the aircraft galley insert from malfunctioning or failing. The system may be relied upon instead of or in addition to relying on a safety loop to minimize the damage to the aircraft galley insert and/or the aircraft housing the aircraft galley insert, where the aircraft galley insert is already malfunctioning or failing.

It is noted herein that a malfunction or failure may be considered an "abnormal situation occurrence," for purposes of the disclosure.

Figure 1B:
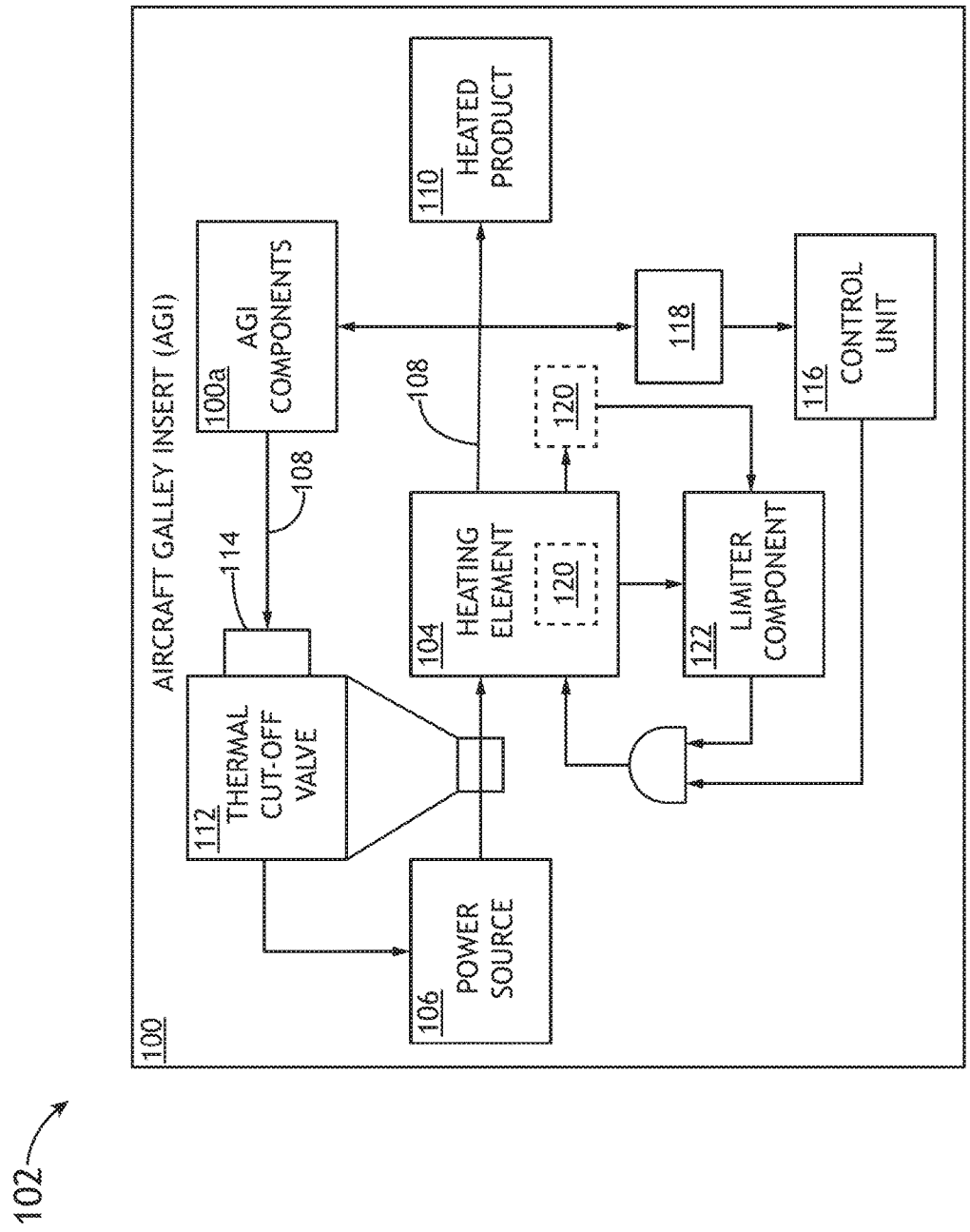
FIG. 1B is a block diagram of an aircraft galley insert architecture, in accordance with one or more embodiments of the disclosure.
Figure 1C:
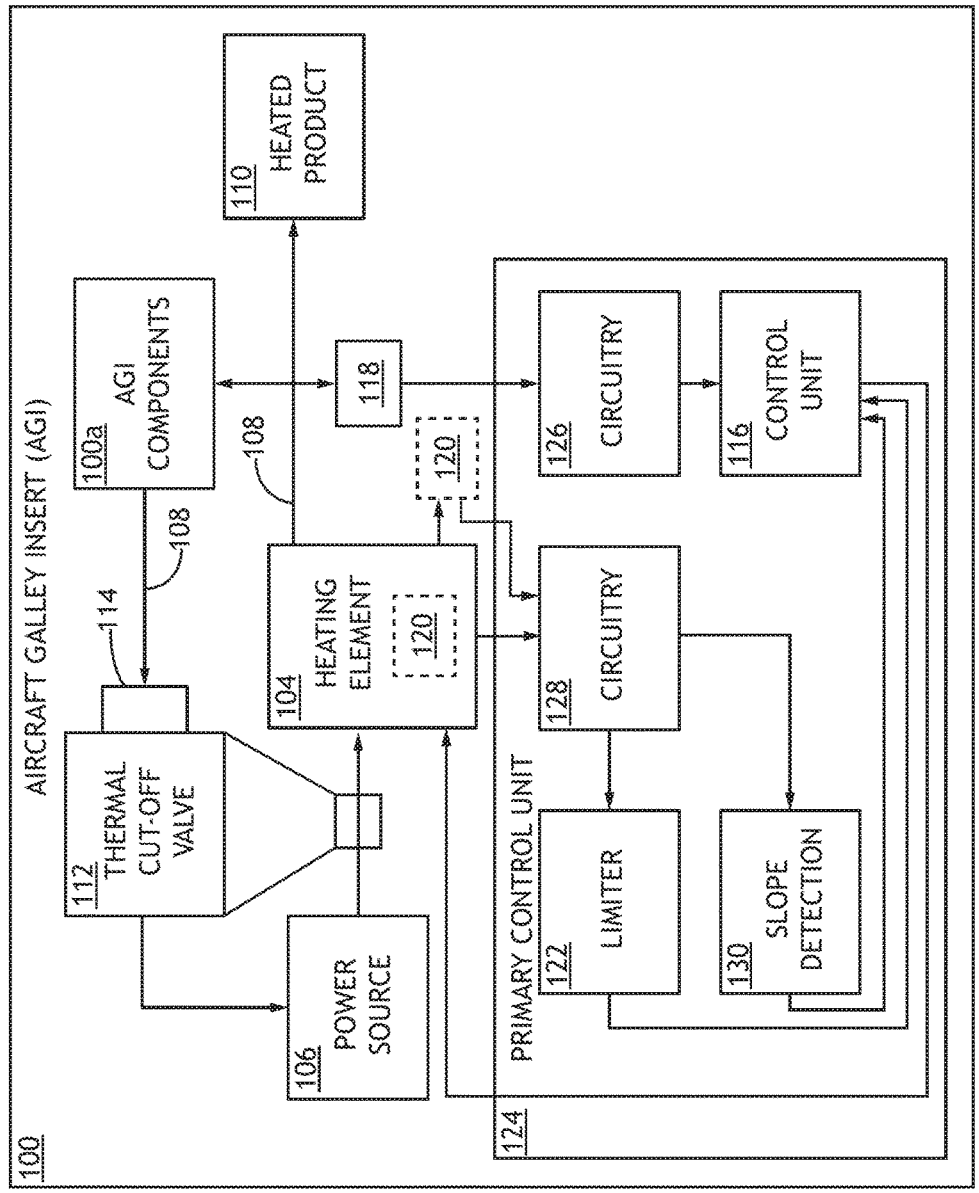
FIG. 1C is a block diagram of an aircraft galley insert architecture, in accordance with one or more embodiments of the disclosure.

FIGS. 1A-1C in general illustrate an aircraft galley insert 100 of an aircraft 102, in accordance with one or more embodiments of the disclosure. For example, the aircraft galley insert 100 may include, but is not limited to, an oven, a beverage maker, or other aircraft galley insert dimensioned to fit within a defined space or cavity in a galley of the aircraft 102. For instance, the oven may be a forced convection oven. In addition, the beverage maker may be a coffee maker.

The aircraft galley insert 100 (or system 100) may include one or more heating subsystems (e.g., a heat exchanger subsystem, or the like) with any number of heating components known in the art (e.g., one or more heating elements 104, one or more heat-resistant components, one or more heat-delivering electrical devices, or the like). The aircraft galley insert 100 may include one or more fluidic subsystems with any number of fluidic components known in the art (e.g., fluidic components including one or more pipes or pipe couplers, one or more tubes or tube couplers, one or more valves, one or more solenoids, or the like). The aircraft galley insert 100 may include one or more electrical subsystems with any number of electrical components known in the art (e.g., one or more wire harnesses, one or more terminal blocks, one or more temperature monitoring components including, but not limited to, sensors, or the like). It is noted herein some or all of the heating components, the fluidic components, and/or the electrical components may be considered aircraft galley insert (AGI) components 100a.

The aircraft galley insert 100 may include a heating element 104 (e.g., a heat-delivering electrical device 104, or the like). For example, the heating element 104 may include a heating element 104 configured to provide heat through direct contact via conduction. By way of another example, the heating element 104 may include a heating element 104 configured to provide heat to a surrounding environment (e.g., air) through convection or radiation. The heating element 104 may be in a standalone subsystem (e.g., within a heating subsystem of the aircraft galley insert 100) or may be integrated with other subsystems (e.g., integrated with a fluidic subsystem). In general, the one or more multiple systems and subsystems within the aircraft galley insert 100 may share any number of components.

The heating element 104 may receive power from a power source 106. For example, the power source 106 may be onboard the aircraft galley insert 100. By way of another example, the power source 106 may be separate from the aircraft galley insert 100 but otherwise installed within the aircraft 102. The heating element 104 may be configured to generate heat to increase the temperature of a fluid within a fluid path 108 (e.g., air within a cavity of the aircraft galley insert 100, water within a water reservoir or tank of the aircraft galley insert 100, or other gas or fluid known in the art in a corresponding fluid path), which may be used to heat a product 110 and generate a heated product 110, where the heated product 110 may be served to a passenger on the aircraft 102. It is noted herein that "food product" (e.g., a heated meal), "drink product" (e.g., a heated beverage), "food and/or drink product," or variants thereof may be considered a "product" or "heated product," for purposes of the disclosure. In addition, it is noted herein the aircraft galley insert 100 may be considered a device or apparatus configured to generate and provide heat to the product 110.

For example, the heating element 104 may include a radiation heating element configured to transfer heat by radiation/absorption of infrared light. For instance, the radiation heating element may include a heating lamp, or the like. By way of another example, the heating element 104 may include a conduction heating element configured to transfer heat through direct contact with a heated product. For instance, the conduction heating element may include a contact grill, a sandwich toaster, or the like. By way of another example, the heating element 104 may include a convection heating element configured to transfer heat through a flowing fluid such as air or water. For instance, the conduction heating element may include an oven, a water tank heat exchanger in a beverage maker, an in-stream (e.g., in a flow path) fluid heater in a beverage maker, or the like. It is noted herein the convection heating element may be a component of a forced convection system (e.g., a forced convection fan-equipped oven, or the like) or a component of a natural convection system (e.g., a fanless oven, or the like).

With convection-based or forced convection-based aircraft galley inserts 100, a heating element temperature of the heating element 104 may need to be considerably hotter than a fluid temperature of the surrounding fluid within the fluid path 108. As such, a particular setpoint temperature may be selected for the fluid temperature of the surrounding fluid within the fluid path 108. Transferring heat from the heating element 104 to the product 110 (e.g., via heating the fluid within the fluid path 108 surrounding the heating element 104 and the product 110) may require a fluid temperature monitoring component 120 a select distance from (e.g., remote from) the heating element 104 to reduce or eliminate any impact the heating element temperature of the heating element 104. The fluid temperature monitoring component 120 may have an output of the to one or more control units 116. The distance or remoteness, however, may increase the risk overheating, as the one or more control units 116 may not control (e.g., limit) the heating element temperature of the heating element 104.

Where the aircraft galley insert 100 is configured for forced fluid flow, the aircraft galley insert 100 may see a large ratio between high heating power and a capability to transfer heat to the heated product (e.g., a heat energy surplus). The large ratio may lead to a high amount of thermal energy being accumulated by the heat-delivering electrical device 104 during a heating cycle. Unintended and/or sudden release of the accumulated thermal energy (e.g., caused by a malfunction or failure) may result in an overheating of the aircraft galley insert 100, leading to temporary or even permanent damage of the aircraft galley insert 100 (and/or the surrounding environment within an aircraft housing the aircraft galley insert 100).

The ratio may be defined as an amount of power that a continuously-operating heating element 104 (in an on-state) may deliver, versus a sum of a heat consumption ratio of a heated product and a heat dissipation ratio of the aircraft galley insert 100 and/or components of the aircraft galley insert 100. In general, the higher the ratio, the faster and/or more severe any damage to the aircraft galley insert 100 and/or the surroundings of the aircraft galley insert 100 may be in the case of a malfunction or failure. For example, a low-power fanless aircraft galley insert that continuously delivers power may not cause severe damage to itself and/or to the surroundings in the event of a failed thermostat or lack of thermostat despite a continuous on-state, as the surrounding environment (e.g., air) has a relatively high heat capacity rate and a relatively high heat dissipation rate. By way of another example, a well-insulated, high-power, forced fluid flow aircraft galley insert that continuously delivers power may cause severe damage to itself and/or to the surroundings in the event of a failed thermostat or lack of thermostat with a continuous on-state, as the surrounding environment (e.g., air) has a relatively low heat capacity rate and a relatively low heat dissipation rate.

An accumulated thermal energy $Q_{accum}$ of the aircraft galley insert 100 and/or a select component of the aircraft galley insert 100 (e.g., a system, a subsystem, element, or heated product housed within the aircraft galley insert 100) may be defined as a simplified equation, where:

$$Q_{accum} = \Delta T_{surr} * m * c_p \qquad \text{EQ. 1}$$

where $\Delta T_{surr}$ is a temperature difference between the select component of the aircraft galley insert 100 and the surrounding environment, m is a mass of the component of the aircraft galley insert 100, and $c_p$ is a specific heat capacity of the component of the aircraft galley insert 100. For purposes of simplicity, if m and $c_p$ are kept constant, then an increase in $Q_{accum}$ has to result in an increase in $\Delta T_{surr}$, and vice versa.

Uncontrolled release of the accumulated thermal energy (e.g., in the event of a malfunction or failure) may lead to an overheating of the aircraft galley insert 100. During normal operation, components of the aircraft galley insert 100 that accumulated thermal energy may be released in a controlled manner. For example, the accumulated thermal energy may be released before the aircraft galley insert 100 stops operating (e.g., at an end of a heating cycle). For instance, forced fluid flow may be provided when the heating element 104 is not providing power to reduce accumulated energy to safe levels at the end of the heating cycle.

Per thermodynamic principles, the higher fluid flow velocity, the more heat may be transferred from the heating element 104 to the surrounding environment (e.g. a surrounding fluid). In addition, a restriction of fluid flow velocity may reduce heat transfer ratio from the heating element 104 such that the $\Delta T_{surr}$ is increased, resulting in an increase of an accumulated thermal energy. Further, the higher the temperature of the heating element 104 relative to the surrounding environment, the more heat may be transferred from the heating element 104. Further, when the temperature of the heating element 104 is close to the temperature of the surrounding environment, an amount of heat being transferred from the heating element 104 may be low and an accumulated thermal energy may rise quickly. Further, when the temperature of the surrounding environment increases, an amount of heat transferred from the heating element 104 may reduce and an accumulated thermal energy may increase.

The aircraft galley insert 100 may include one or more thermal cut-offs (TCO) 112 The one or more TCO 112 may be configured to interrupt operation of the aircraft galley insert 100 when it determines a temperature above a select threshold or limit (e.g., a TCO threshold or limit). The one or more TCO 112 may include one or more temperature monitors 114 (e.g., one or more sensors 114, or the like) configured to monitor the temperature of the fluid within the fluid path 108 heated by the heating element 104. It is noted herein the TCO 112 may be directly heated by the heating element 104 (e.g., by coupled to the heating element 104) or indirectly heated by the heating element 104 (e.g., being coupled to a separate structure within the aircraft galley insert 100 at a location proximate to the heating element 104).

It is noted herein that the TCO 112 is not intended to measure the temperature of the heating element 104, but instead is intended to monitor a temperature of the whole galley insert 100 or a select component of the galley insert 100.

The aircraft galley insert 100 may include one or more control units 116. The one or more control units 116 may include or may be configured as one or more of a mechanical device, an electronic device, and/or an electro-mechanical device.

The one or more control units 116 may be configured to operate via one or more algorithmic functions performed via physical components, via circuitry, and/or via software. For example, the one or more algorithmic functions may include, but are not limited to, a control algorithm, a neural network (e.g., with states represented as nodes and hidden nodes and transitioning between them until an output is reached via branch metrics), a kernel-based classification method, a Support Vector Machine (SVM) approach, canonical-correlation analysis (CCA), factor analysis, flexible discriminant analysis (FDA), principal component analysis (PCA), multidimensional scaling (MDS), principal component regression (PCR regression), projection pursuit, data mining, prediction-making, exploratory data analysis, supervised learning analysis, Boolean logic (e.g., resulting in an output of a complete truth or complete false value), fuzzy logic (e.g., resulting in an output of one or more partial truth values instead of a complete truth or complete false value), or the like. For example, in the case of a control algorithm, the set of program instructions may be configured to operate via proportional control, feedback control, feedforward control, integral control, proportional-derivative (PD) control, proportional-integral (PI) control, proportional-integral-derivative (PID) control, or the like.

The one or more control units 116 may be similar in build to a controller. The one or more control units 116 may include a programmable device utilizing software to realize one or more controlling functions. For example, the one or more control units 116 may include one or more processors and memory. The memory may store one or more sets of program instructions. The one or more processors may be configured to execute the one or more sets of program instructions to carry out one or more of the various steps described throughout the present disclosure. The one or more control units 116 may include one or more communication interfaces. The one or more control units 116 may include or be coupled to a user interface. The user interface may include one or more display devices. The user interface may include one or more user input devices.

Although embodiments of the disclosure illustrate the one or more control units 116 as being similar to a controller, it is noted herein the one or more control units 116 may be circuitry with controller-like capabilities. Therefore, the above description should not be interpreted as a limitation on the disclosure but merely an illustration.

The one or more control units 116 may be configured to adjust operation of the aircraft galley insert 100. For example, the one or more control units 116 may be configured to adjust operation of the aircraft galley insert 100 when it determines a temperature of the fluid within the fluid path 108 ($T_{fluid}$) and its relation to a select temperature (e.g., a setpoint temperature). By way of another example, the one or more control units 116 may be configured to turn the heating element on and/or off. By way of another example, the one or more control units 116 may be configured for continuous power adjustment during operation of the aircraft galley insert 100.

The one or more control units 116 may receive information from one or more fluid temperature monitoring components 118 (e.g., one or more sensors 118, or the like) configured to monitor the temperature of the fluid within the fluid path 108 heated by the heating element 104. For example, the one or more fluid temperature monitoring components 118 may include, but are not limited to, one or more resistive sensors or thermistors having an electrical resistance dependent on the heating element temperature 202. For instance, the thermistor may include, but is not limited to, a PTC thermistor.

It is noted herein the one or more control units 116 may monitor the temperature of the fluid within the fluid path 108 and not a temperature of the heating element 104 ($T_{element}$). This lack of monitoring the temperature of the heating element 104, however, may lead to overheating issues within the aircraft galley insert 100.

It is noted herein a primary control unit 116 may still be powered to indicate an error state where a TCO 112 cuts off electrical power being delivered to the heating element 104.

Figure 2:
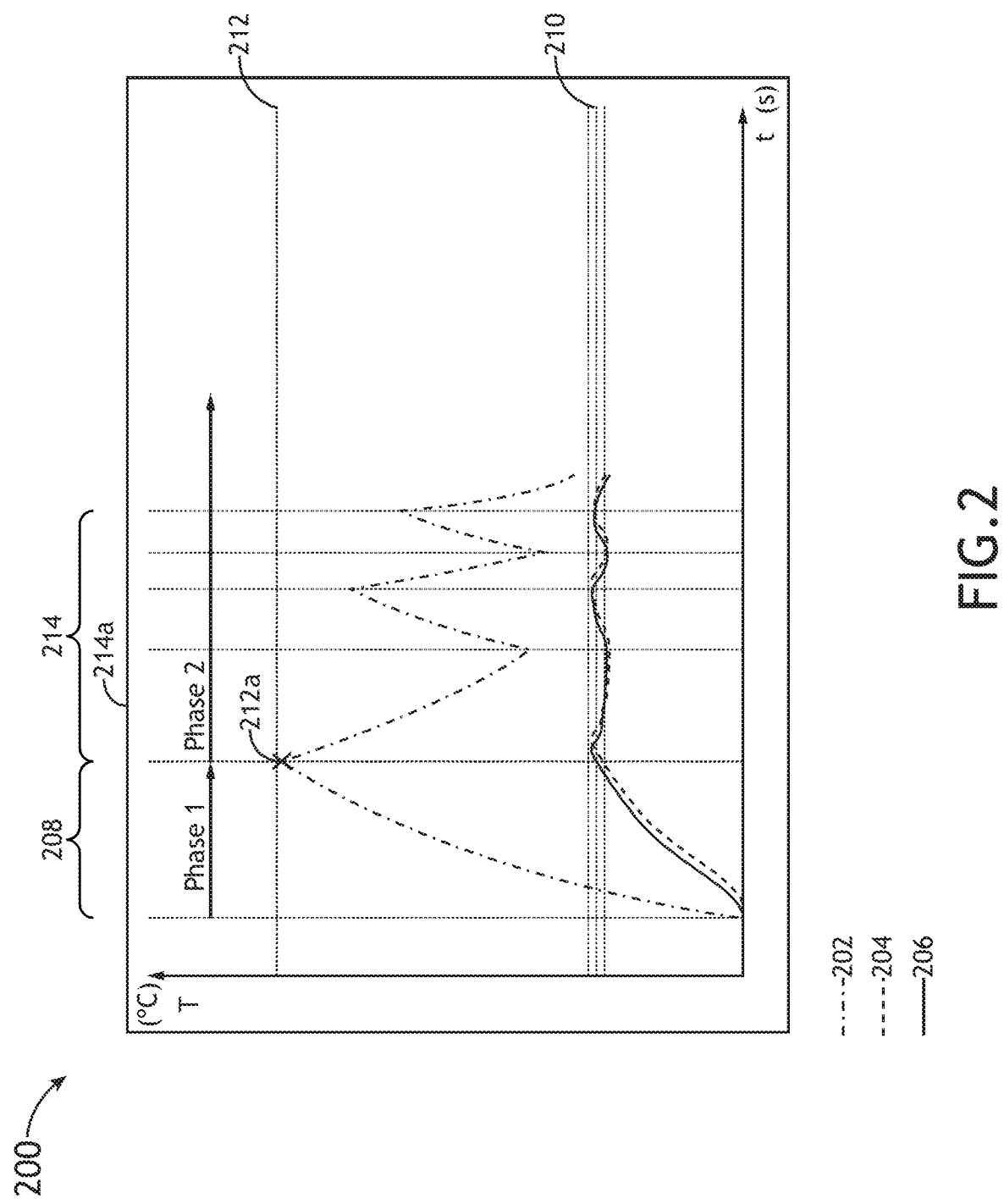
FIG. 2 is a graph of temperature versus time illustrating an operation of an aircraft galley insert, in accordance with the disclosure.

FIG. 2 illustrates a graph 200 of a typical profile of a heating cycle of an aircraft galley insert 100 utilizing forced fluid flow, in accordance with the disclosure during normal operation. In the graph 200, a heating element 104 may include a heating element temperature 202, a TCO 112 (e.g., which may be subjected to a TCO temperature 204), and a fluid within the fluid path 108 (e.g., air) surrounding the heating element 104 (e.g., which may have a fluid or airflow temperature 206), each of which may be analyzed as a function of time (t).

In a first phase 208, power is continuously applied to the heating element 104 and the temperature 202 of the heating element 104 rises, delivering heat to the air until the airflow temperature 206 ($T_{airflow}$) reaches a set point temperature 210. At the first occurrence of the set point temperature 210 being reached at the end of the first phase 208, the heating element temperature 202 may reach a heating element peak temperature level 212a ($T_{peak}$) (e a which is most commonly the highest temperature observed for the heating element 104 during a heating cycle of the aircraft galley insert 100 with forced airflow. The heating element peak temperature level 212a ($T_{peak}$) may determine a maximum heating temperature during normal operation of the aircraft galley insert 100, such as a heating element peak temperature level during normal operation 212 ($T_{peak}$). It is noted herein that the heating element peak temperature level 212a ($T_{peak}$) may be different in cases where the aircraft galley insert 100 operates out of normal operating conditions, as opposed to the heating element peak temperature level 212 ($T_{peak}$) during normal operation. In the example illustrated in FIG. 2, the peak temperature 212a is equal to the heating element peak temperature level 212 during normal operation, as FIG. 2 represents normal operation of the aircraft galley insert 100. It is noted herein that the heating element peak temperature level 212a ($T_{peak}$) 1 and the heating element peak temperature level during normal operation 212 ($T_{peak}$) may be the most commonly considerably higher than the airflow temperature 206 and the set point temperature 210.

In a second phase 214, the power may be cycled to the heating element 104 to maintain the air temperature 206 at or within a temperature range surrounding the set point temperature 210. The heating element temperature 202 may fluctuate a considerable amount compared to the airflow temperature 206. The second phase 214 may include multiple sub-phases 214a, each sub-phase 214a defined by a point in time where power to the heating element 104 is turned off or turned on (or controlled via pulse width modulation (PWM), or some other modulated control function). It is noted herein the time interval between the sub-phases 214a may change (e.g. most commonly decrease) as time progresses in a case of on-off controlling of the heating element 104. In addition, it is noted herein the average heating element temperature 212 of the heating element 104 may most commonly decrease as time progresses.

FIGS. 3-6 generally illustrate scenarios where deviation from desired temperatures due to an unintended and/or sudden release of energy may cause damage to the aircraft galley insert 100, illustrated as a graph of temperature versus time, in accordance with one or more embodiments of the disclosure.

Figure 3:
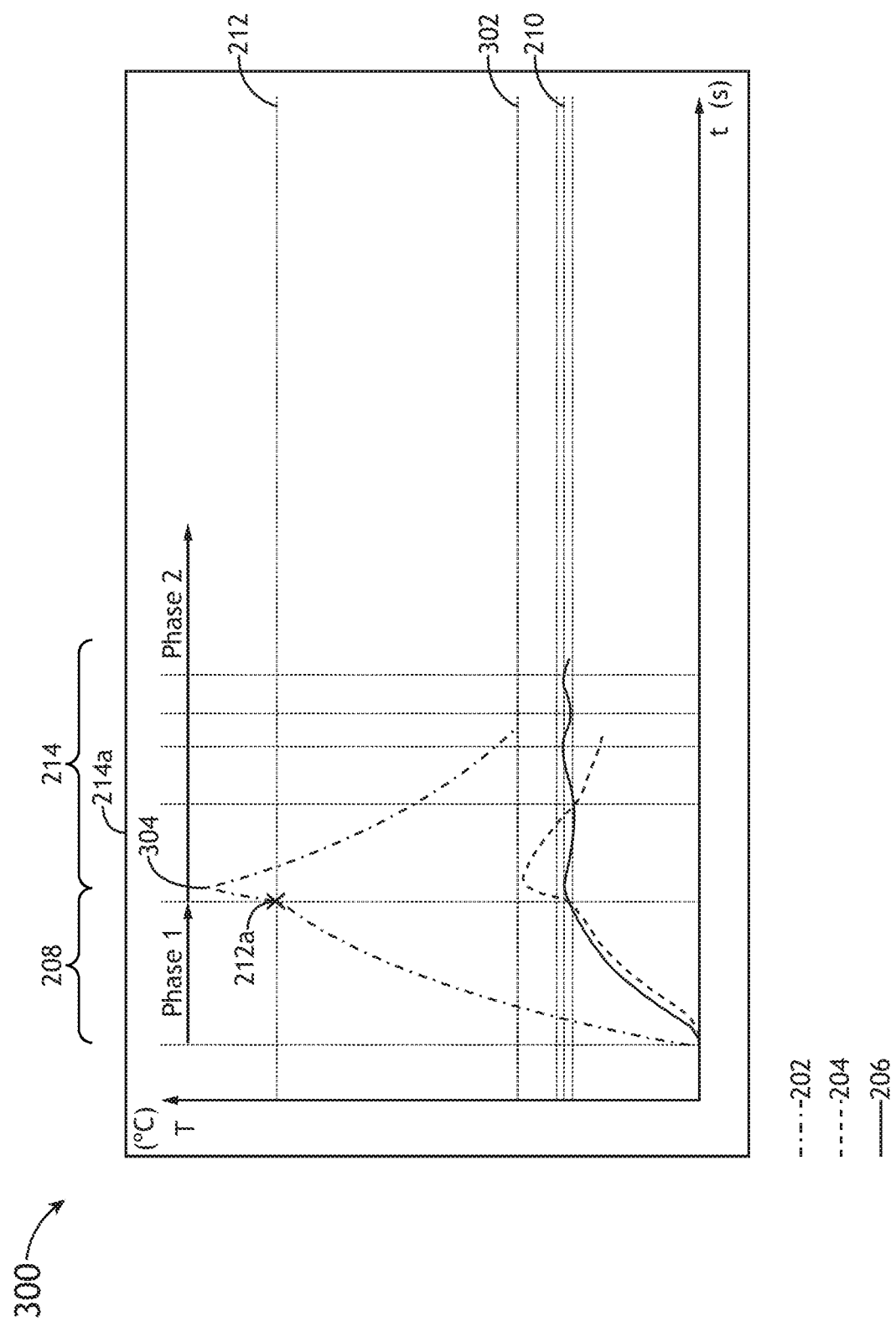
FIG. 3 is a graph of temperature versus time illustrating an operation of an aircraft galley insert, in accordance with the disclosure.

FIG. 3 illustrates the graph 300 of a profile of a heating cycle of an aircraft galley insert 100 with a malfunctioning or failing component, in accordance with the disclosure. In general, the graph 300 illustrates a situation where power is cut off to the aircraft galley insert 100 at the end of the first phase 208.

At the end of the first phase 208, the heating element temperature 202 of the heating element 104 may be at the peak temperature 212a, which is in the example illustrated in FIG. 3 is the level of the heating element peak temperature level 212 as the aircraft galley insert 100 was operating normally until the end of the first phase 208, If the abnormal situation occurs and the aircraft galley insert 100 will suddenly stop to operate properly (or at all) the accumulated energy within the heating element 104 may be quickly released, causing a temperature spike up to a peak-plus temperature 304 ($T_{peak+}$). It is noted herein that the peak-plus temperature 304 ($T_{peak+}$) may be higher than he heating element peak temperature level 212a ($T_{peak}$) and the heating element peak temperature level during normal operation 212 ($T_{peak}$). For example, the accumulated energy within the heating element 104 may be quickly released because a control unit of the aircraft galley insert 100 may fail, an error may occur requiring an immediate stopping the operation of the aircraft galley insert 100, electrical power being delivered to the aircraft galley insert 100 may be cut off (e.g., circuit breaker activation or emergency situations), or the like.

The reaching of the heating element temperature 202 of the spike the peak-plus temperature 304 ($T_{peak+}$) may be transferred by any means of heat transfer to TCO temperature 204 in a form of TCO temperature 204 peak. It is noted herein that, until the abnormal condition occurred, the aircraft galley insert was operating normally and, according to proper design principle, the most common TCO temperature 204 does not reach TCO cut-off temperature 302 and the TCO 112 is tripped.

Figure 4:
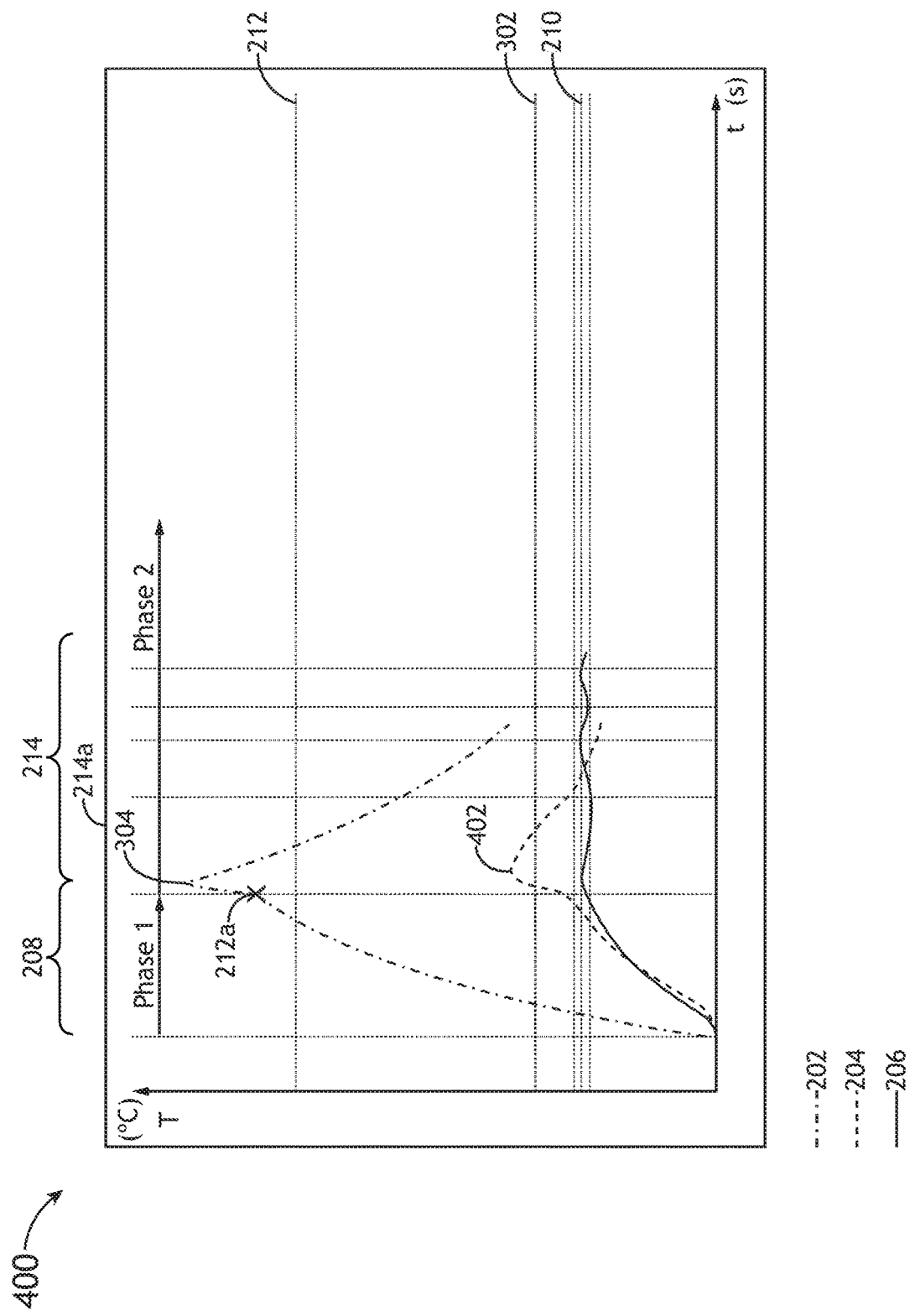
FIG. 4 is a graph of temperature versus time illustrating an operation of an aircraft galley insert, in accordance with the disclosure.

FIG. 4 illustrates a graph 400 of a profile of a heating cycle of an aircraft galley insert 100 subjected to restricted fluid flow, in accordance with the disclosure. In general, the graph 400 illustrates a situation where power is cut off to the aircraft galley insert 100 at the end of the first phase 208 under an operation condition with airflow restricted.

[ono] At the end the first phase 208, the heating element temperature 202 of the heating element 104 may be at the peak temperature 212a, which is higher than the heating element peak temperature level 212 during normal operation due to restricted airflow. The heating element temperature 202 of the heating element 104 at the heating element peak temperature 212a is higher than heating element peak temperature level during normal operation 212 ($T_{peak}$). may cause a higher-than-normal accumulated energy within the heating element 104. If the accumulated energy within the heating element 104 is quickly released, the temperature spike (e.g., the peak-plus temperature 304) may be caused in the heating element temperature 202 of the heating element 104. In such conditions the spike the peak-plus temperature 304 ($T_{peak+}$) is higher than the spike of the peak-plus temperature 304 ($T_{peak+}$) after normal operation of the aircraft galley insert 100, and may be transferred by any means of heat transfer to the TCO temperature 204 in a form of the TCO temperature 204 peak exceeding TCO cut-off temperature 302, causing its tripping and resulting in a galley insert failure. In addition, the higher-than-normal accumulated energy leading to the peak-plus temperature 304 may damage the heating element 104 and/or other components of the aircraft galley insert 100, the aircraft galley insert 100 in its entirety, and/or components in the environment surrounding the aircraft galley insert 100.

Figure 5:
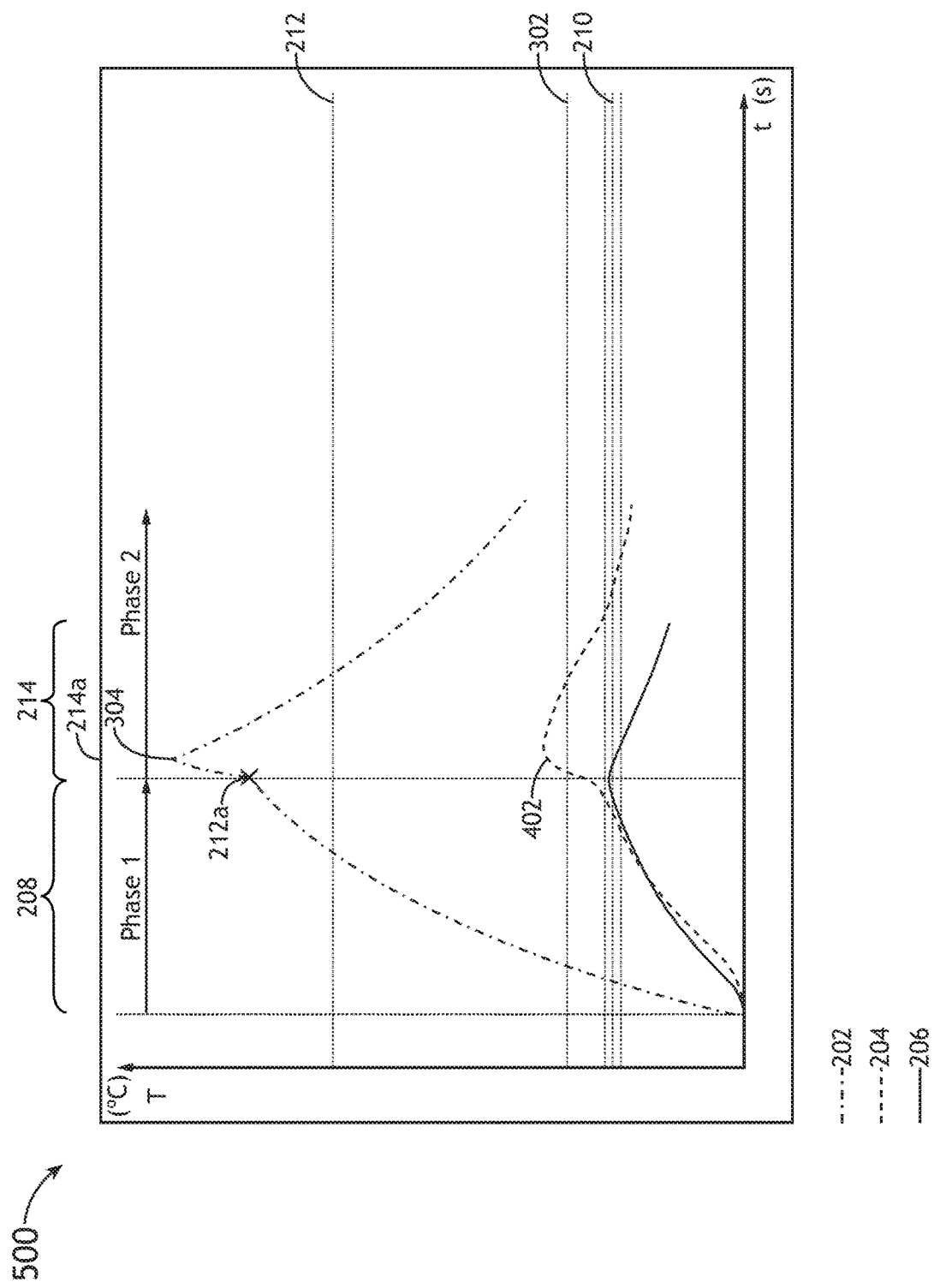
FIG. 5 is a graph of temperature versus time illustrating an operation of an aircraft galley insert, in accordance with the disclosure.

FIG. 5 illustrates a graph 500 of a profile of a heating cycle of an aircraft galley insert 100 subjected to a thermally heavy load, in accordance with the disclosure. In general, the graph 500 illustrates a situation where power is cut off to the aircraft galley insert 100 at the end of the first phase 208 with an operating condition where a thermally heavy load being present.

The heating element 104 may be subjected to a thermally heavy load which may require a lot of heat transferred from the heating element 104 up in an effort to counter a quick absorption of heat by the product. For example, a thermally heavy load may be caused by a high thermal capacity (e.g., high mass and high specific heat capacity), high thermal diffusivity, high thermal conductivity, or the like.

A thermally heavy load may increase the length of the first phase 208 to increase as the airflow temperature 206 approaches the level of the set point temperature 210. This may cause the heating element 104 to run longer, increasing the heating element temperature 202 to the peak temperature 212a, which is higher than the heating element peak temperature level 212 during normal operation, and which may cause a higher-than-normal accumulated energy within the heating element 104. If the accumulated energy within the heating element 104 is quickly released, the temperature spike (e.g., the peak-plus temperature 304) may be caused in the heating element temperature 202 of the heating element 104. In such conditions, the spike the peak-plus temperature 304 ($T_{peak+}$) is higher than the spike of the peak-plus temperature 304 ($T_{peak+}$) after normal operation of the aircraft galley insert 100 and may be transferred by any means of heat transfer to the TCO temperature 204 in a form of the TCO temperature 204 peak exceeding the TCO cut-off temperature 302, causing its tripping and resulting in a galley insert failure. In addition, the higher-than-normal accumulated energy leading to the peak-plus temperature 304 may damage the heating element 104 and/or other components of the aircraft galley insert 100, the aircraft galley insert 100 in its entirety, and/or components in the environment surrounding the aircraft galley insert 100.

Figure 6:
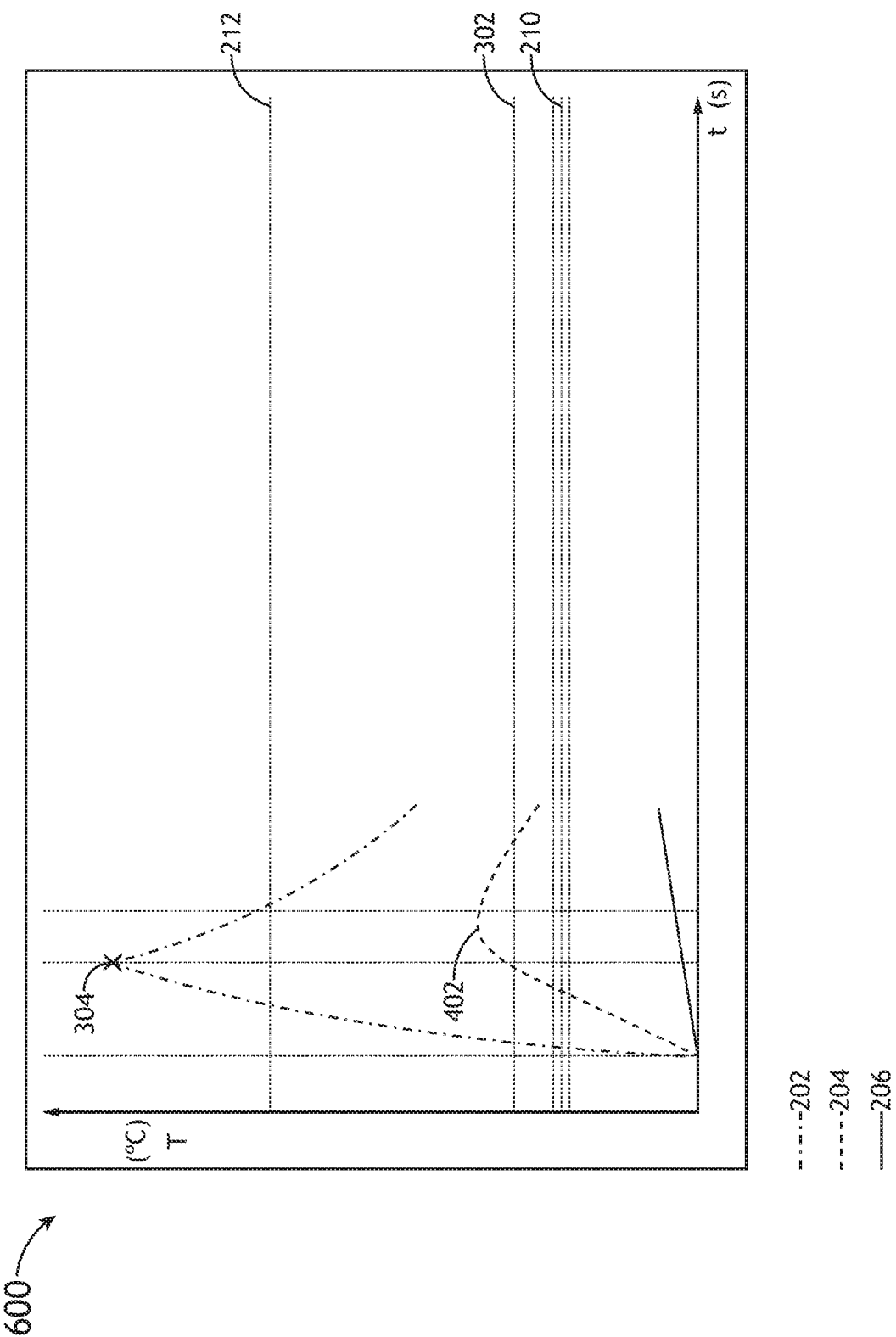
FIG. 6 is a graph of temperature versus time illustrating an operation of an aircraft galley insert, in accordance with the disclosure.

FIG. 6 illustrates a graph 600 of a profile of a heating cycle of an aircraft galley insert 100 subjected to a fully or nearly-fully fluid flow restriction, in accordance with the disclosure. In general, the graph 600 illustrates a situation where airflow is nearly completely restricted, the aircraft galley insert 100 is overheated, and the TCO 112 is triggered to interrupt power to the heating element 104.

The aircraft galley insert 100 may be subjected to a fully or nearly-fully fluid flow restriction. For example, the fluid flow restriction may be caused by a motor malfunction, fan blockage, airflow path blockage, or the like.

As there is no fluid flow, heat dissipation from the heating element 104 to the surrounding air may be greatly reduced, resulting in a very rapid increase of the heating element temperature 204. It is noted herein such a rapid increase may be indicative of a severe, abnormal heating situation. Although the aircraft galley insert 100 may include safety loop components (e.g., the TCO 112, or the like) to monitor and address the issue, the safety loop components may heat up more slowly than the rapid rate of the heating element temperature 204. As such, a detection of the abnormal heating situation may result in late safety loop component tripping and cutting off power being delivered to the heating element 104. At the moment of safety loop component tripping, the heating element temperature 204 may reach the peak temperature 212a, which is much higher than the heating element peak temperature level 212 during normal operating conditions.

The excess temperature at the peak temperature 212a may severely damage the heating element 104 and/or other components of the aircraft galley insert 100, the aircraft galley insert 100 in its entirety, and/or components in the environment surrounding the aircraft galley insert 100.

In this regard, the present disclosure is directed to a system for preventing overheating in the aircraft galley inserts 100. The system may be configured to monitor an aircraft galley insert 100 and/or components in the environment surrounding the aircraft galley insert 100 during normal operation to attempt to reduce and/or prevent the aircraft galley insert 100 from being damaged, malfunctioning, or failing caused by temperatures of select or all components of the aircraft galley insert 100 that may be exceeding temperatures usually reached during normal operation (e.g., overheating). The system may be also configured to monitor the aircraft galley insert 100 during abnormal situations to minimize reduce of damage, when the aircraft galley insert 100 is already malfunctioning or failing. The system may be utilized instead of or in addition to a safety loop in the aircraft galley insert 100.

FIGS. 7-10 generally illustrate the principle of operation for the system for preventing overheating in the aircraft galley insert 100, in accordance with one or more embodiments of the disclosure.

Figure 7:
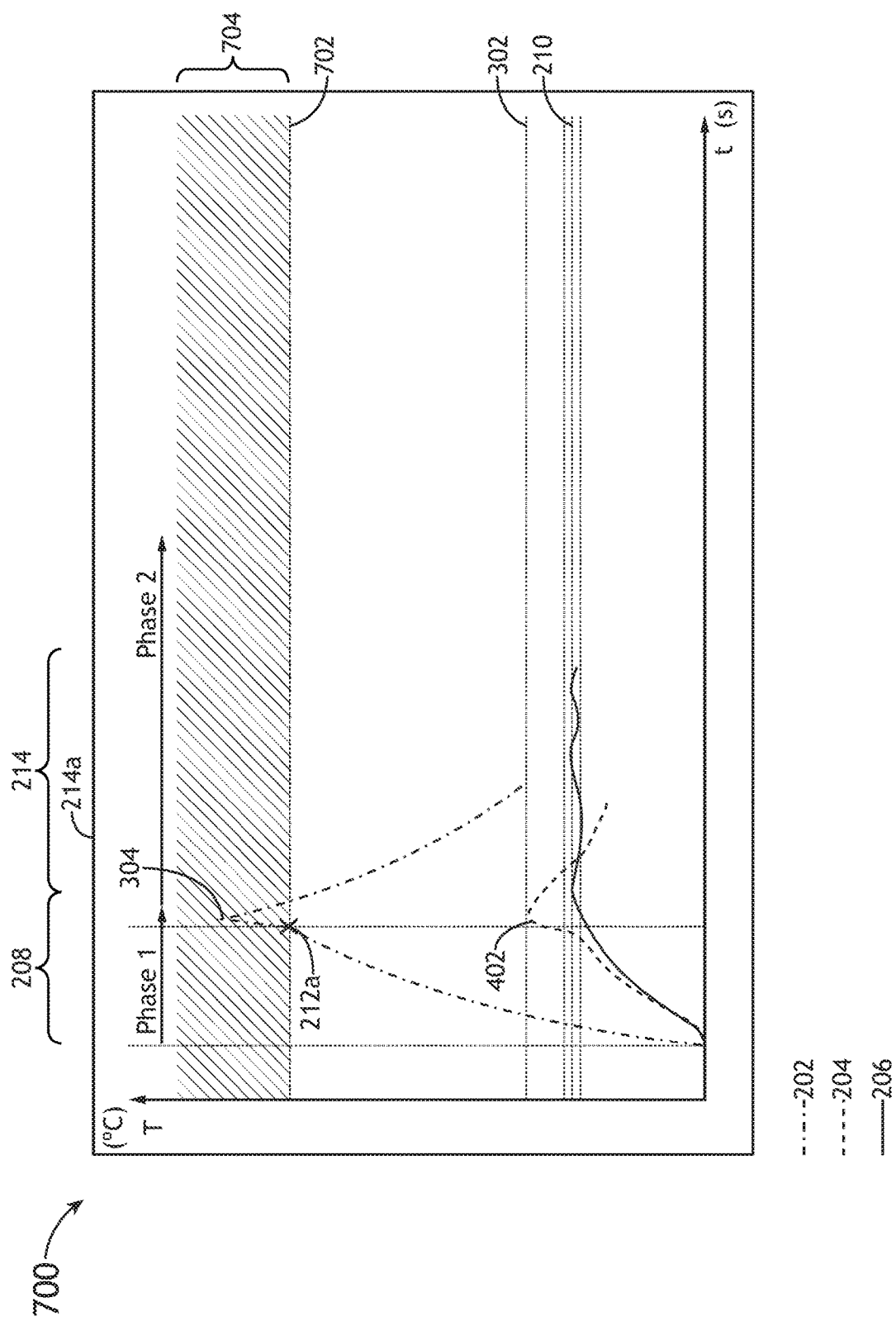
FIG. 7 is a graph of temperature versus time illustrating an operation of an aircraft galley insert, in accordance with one or more embodiments of the disclosure.

FIG. 7 illustrates a graph 700 of a profile of a heating cycle of an aircraft galley insert 100 including a temperature limit threshold 702, in accordance with one or more embodiments of the disclosure. In general, the graph 700 illustrates a situation where power is cut off to the aircraft galley insert 100 at the end of the first phase 208 with one or more embodiments described throughout the disclosure being applied to reduce or prevent overheating.

During normal operating conditions, the temperature limit threshold 702 may or may not be equal or close to the heating element peak temperature level 212 during normal operation. The system for preventing overheating in the aircraft galley insert 100 may be utilized to prevent the heating element temperature 202 from exceeding the temperature limit threshold 702 and entering an overheating temperature zone or region 704. As the heating element temperature 202 will never exceed temperature limit threshold 702, the maximum level of accumulated thermal energy in the heating element 104 will also be limited. The temperature limit threshold 702 may be set to a value where maximum accumulated thermal energy value is limited to a level such that even sudden and rapid release of this energy does not cause damage and/or an amount of damage is reduced to the aircraft galley insert 100 and/or components in the environment surrounding the aircraft galley insert 100.

Figure 8:
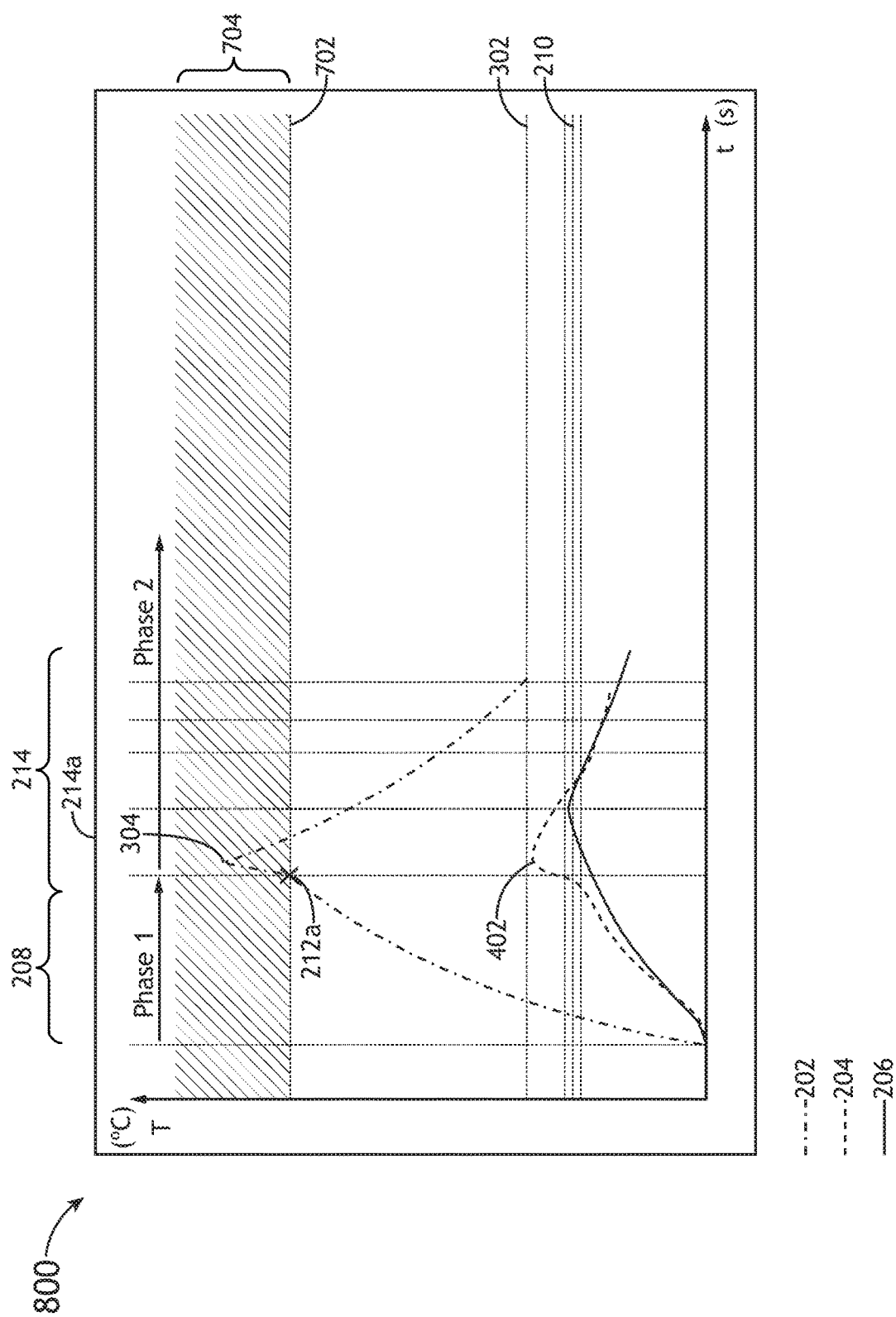
FIG. 8 is a graph of temperature versus time illustrating an operation of an aircraft galley insert, in accordance with one or more embodiments of the disclosure.
Figure 9:
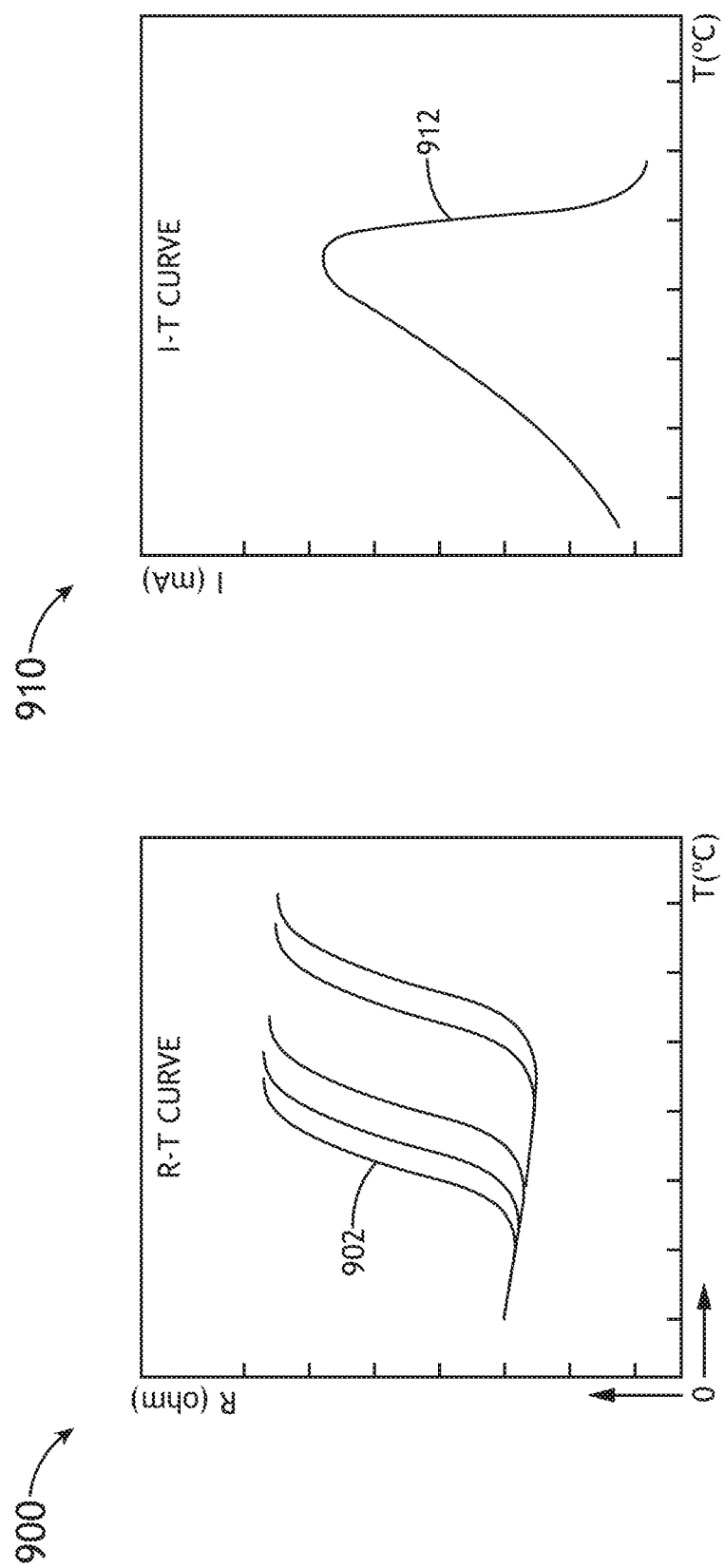
FIG. 9A is a graph of resistance of a heating element of an aircraft galley insert versus temperature of the heating element of the aircraft galley insert, in accordance with one or more embodiments of the disclosure.
FIG. 9B is a graph of electrical current through a heating element of an aircraft galley insert versus temperature of the heating element of the aircraft galley insert, in accordance with one or more embodiments of the disclosure.

FIG. 8 illustrates a graph 800 of a profile of a heating cycle of an aircraft galley insert 100 including a limit of the temperature of the heating element 202 below the temperature limit 702 limiting by the means of accumulated thermal energy within the heating element 104, in accordance with one or more embodiments of the disclosure. In general, the graph 800 illustrates a situation where power is cut off to the aircraft galley insert 100 at the end of the first phase 208, following a thermally-heavy load being present in the aircraft galley insert 100, with one or more embodiments described throughout the disclosure being applied to reduce or prevent overheating.

During normal operating condition, the temperature limit threshold 702 may or may not be equal or close to the heating element peak temperature level 212 during normal operation reached by the heating element 104. The system for preventing overheating in the aircraft galley insert 100 may be utilized to prevent the heating element temperature 202 from exceeding the temperature limit threshold 702 and entering an overheating temperature zone or region 704. As the heating element temperature 202 will never exceed temperature limit threshold 702, the maximum level of accumulated thermal energy in the heating element 104 will also be limited.

As the thermally-heavy load is present in the aircraft galley insert 100, the first phase 208 will be extended. Despite this, the temperature limit threshold 702 may be set to a value where maximum accumulated thermal energy values is limited to a level such that even sudden and rapid release of this energy does not cause damage and/or an amount of damage is reduced to the aircraft galley insert 100 and/or components in the environment surrounding the aircraft galley insert 100.

It is noted herein, however, that the thermally-heavy load presence in the aircraft galley insert 100 is only an example of an abnormal condition different from normal operating conditions. For example, the abnormal condition may include, but is not limited to, partially restricted airflow. Therefore, the above description should not be interpreted as a limitation on the disclosure but merely an illustration.

A limiting of the heating element temperature 202 may be accomplished in several ways as described in accordance with one or more embodiments of the disclosure, having different technical principles. The goal of each and all of the several ways as described in accordance with one or more embodiments of the disclosure is the limiting the thermal energy accumulated by the heating element 104 by limiting the heating element temperature 202 to select safe levels such that even sudden and rapid release of this energy does not cause damage and/or an amount of damage is reduced to the aircraft galley insert 100 and/or components in the environment surrounding the aircraft galley insert 100.

It is noted herein, however, that others realization of the goal of limiting the thermal energy accumulated by the heating element 104 by limiting the heating element temperature 202 may be understood as considered by the one or more embodiments described throughout the disclosure.

Referring again to FIG. 1B, to determine whether the heating element 104 temperature 202 has exceeded the temperature limit threshold 702 and entered the overheating temperature zone or region 704, the heating element 104 may need to be continuously monitored within the aircraft galley insert 100. The aircraft galley insert 100 may include one or more temperature monitoring components 120 configured to monitor the heating element temperature 100 in addition to safety loop components (e.g., the TCO 112).

The one or more temperature monitoring components 120 may include one or more direct-contact temperature sensors or sensors integrated within the heating element 104. For example, the one or more direct-contact temperature sensors or sensors integrated within the heating element 104 may include, but are not limited to, thermocouples, thermistors, built-in thermostats, or the like. For instance, the one or more direct-contact temperature sensors or sensors integrated within the heating element 104 may include, but are not limited to, one or more cartridge heaters with built-in thermocouples.

The one or more temperature monitoring components 120 may include one or more semidirect-contact temperature sensors positioned proximate to one or more heat conducting components. For example, the one or more semidirect-contact temperature sensors may receive heat for the heating element 104 through, but are not limited to receiving heat for the heating element 104 through, distance plates, brackets, spacers, or the like. Where distance plates, brackets, spacers, or the like are implemented, the one or more semidirect-contact temperature sensors may be considered as being attached to the one or more heat conducting components.

The one or more temperature monitoring components 120 may include one or more remote temperature sensors. For example, the one or more remote temperature sensors may include, but are not limited to, infrared optical temperature sensors, infrared pyrometers, conduction temperature sensors (e.g. thermistor, thermocouple) located at a distance (e.g. air gap exist between sensors and the heating element 104) and receiving heat from the heating element by any means of the heat transfer, or the like).

The one or more temperature monitoring components 120 may include multiple components 120, the multiple components 120 including one or more direct-contact temperature sensors, one or more semidirect-contact temperature sensors, and/or one or more remote temperature sensors. For example, the multiple components 120 may include, but are not limited to, thermochromic spot components or area or thermo-dependent optical parameters components, or the like.

The one or more temperature monitoring components 120 may include one or more wave-emitting (e.g., light, or the like) components and/or one or more soundwave-emitting (e.g., piezoelectric buzzer, or the like) components, in communication with one or more optical sensors and/or one or more sound-sensitive components (e.g., sound transceiver, or the like).

The aircraft galley insert 100 may include one or more temperature monitoring components 120 for the heating element temperature 202 of the heating element 104 and one or more temperature monitoring components 120 for the airflow temperature 206. As such, the illustrations provided in FIGS. 1B and 1C may be considered non-limiting. Therefore, the above description should not be interpreted as a limitation on the disclosure but merely an illustration.

Due to the possibility of temperature variation in the heating element 104 caused by parts of the heating element 104 including different temperatures (e.g., caused by geometry, type, production variations, fluid flow geometry, cold/hot spots, or the like), a measured temperature by one or more temperature monitoring components 120 may be different than any real temperature of the heating element 104.

The aircraft galley insert 100 may include one or more limiter components 122 for the heating element 104. For example, the one or more limiter components may include one or more heating element temperature limiters, as described throughout the disclosure. By way of another example, the one or more limiter components may include one or more heating element temperature rise slope limiters, as described throughout the disclosure. As such, any embodiment directed to the "limiter component 122" or variants thereof may be understood to be directed to the "heating element temperature limiter" and/or the "heating element temperature rise slope limiter."

The one or more limiter components 122 may include or may receive information from one or more temperature monitoring components 120 configured to monitor the heating element temperature 202 of the heating element 104. For example, the one or more temperature monitoring components 120 may include, but are not limited to, one or more resistive sensors or thermistors. The one or more limiter components 122 may be configured to output signals to the heating element 104, similar to the one or more control units 116.

In one example, the one or more limiter components 122 may generate an "on" signal when the heating element temperature 202 of the heating element 104 does not exceed the temperature limit threshold 702. It is noted herein the heating element 104 may be controlled via the one or more control units 116 when the one or more limiter components 122 generates the "on" signal.

In this example, the one or more limiter components 122 may generate an "off" signal when the heating element temperature 202 of the heating element 104 does exceed the temperature limit threshold 702. In this example, a limiter signal is mixed with the control unit 116 signal via a limiter component 122 having both logic and function, which may generate an "off" signal by the limiter component 122 to turn off the heating element 104. The "off" signal from the limiter component 122 may be considered as overriding the one or more control units 116 "on" signal, and the heating element 104 will not be turned back on until the one or more limiter components 122 again generates an "on" signal, due to properties of and function of the limiter component 122. In this regard, the control of the one or more limiter components 122 may be considered to be prioritized over the control of the one or more control units 116 when the heating element temperature 202 of the heating element 104 meets or exceeds the temperature limit threshold 702.

The one or more limiter components 122 may include a hysteresis channel configured to monitor changes in the heating element temperature 202 of the heating element 104 and prevent quick transitions between an "on" state and an "off" state when the heating element temperature 202 of the heating element 104 is near the temperature limit threshold.

It is noted herein that the configuration of the one or more limiter components 122 as illustrated in FIG. 1B is only an example of a possible variant of an integrating limiter function in the aircraft galley insert 100. In addition, it is noted herein the one or more limiter components 122, a signal mixer, and/or circuitry of the one or more limiter components 122 and/or the signal mixer may be integrated in the one or more control units 116 by any means and/or in any scope (e.g., for architecture simplicity). One example of an alternative architecture is illustrated in FIG. 1C, where the one or more limiter components 122 may provide and on/off signal to the one or more control units 116, where it is processed and mixed with a control unit 116 signal controlling the heating element 104.

As the alternative to separate components, the one or more limiter components 122, signals mixing component, and necessary circuitry may be integrated in a thermostat device and can be integrated with the heating element 104. In this case, the thermostat device cuts off or reduces electrical power to the heating element 104 when the heating element temperature 202 meet or exceeds the select temperature limit threshold 702, providing the heating element 104 temperature limiting function. It is noted herein this thermostat device functions independently of signals generated by the one or more control units 116, and may be prioritized over the signals generated by the one or more control units 116.

The one or more temperature monitoring components 120 within the aircraft galley insert 100 may include one or more ohmmeters, one or more ammeters, one or more voltmeters, or other gauges configured to measure aspects of the heating element 104, either as a whole or at a particular location within the heating element 104, such as resistance, current, voltage, or the like. For example, the heating element 104 may increase in resistance as the temperature increases, which may result in a reduction of current flowing through the heating element 104 to a level where energy delivered to the heating element 104 and energy dissipated to the surrounding environment balances (e.g., potentially to the point where a temperature rise of the heating element 104 may be stopped or reduced).

FIGS. 9A and 9B illustrate principles of alternative technical arrangements of the heating element 102 temperature limiting function.

FIG. 9A is a graph 900 with curves 902, each curve 902 illustrating a variant of heating element resistance versus temperature characteristics, in accordance with one or more embodiments of the disclosure. The heating element 104 may be configured in terms of material composition and physical properties in such a way that exceeding the temperature limit threshold 702 of the heating element 104, may start to rapidly increase its resistance.

FIG. 9B is a graph 910 with curves 912, each curve 912 being a result of a particular configuration of the heating element 104. When resistance of the heating element 104 rises, the electrical current flowing through the heating element 104 decreases (e.g., by Ohm's law). As heat generated by the heating element 104 is a function of the electrical current, at certain heating element temperatures 202 such limited electrical current is no longer enough to increase the heating element temperature 202 and the heating element temperature 202 stabilizes. Such a property of heating element configuration is considered a heating element temperature 202 limiting function and, as such, is in accordance with embodiments with one or more embodiments of the disclosure.

The heating element temperature limit threshold 702 may be adjusted during operation of the aircraft galley insert 100 based on at least one of one or more models, one or more conditions of the aircraft galley insert 100, or one or more user inputs. Although embodiments of the disclosure illustrate the use of one or more temperature monitoring components 120 within the aircraft galley insert 100, it is noted herein the temperature of the heating element 104 may be estimated without direct or indirect measurements, such that the aircraft galley insert 100 may include one or more heating element temperature estimators. For example, estimation may be possible with aircraft galley inserts 100 that operate with small variations in one or more physical conditions such as environmental conditions surrounding the aircraft galley insert, one or more modes or durations of operation, or one or more operating conditions of the galley insert such as initial operating conditions or boundary operating conditions (e.g., similar heating cycle temperature, similar content every time, similar content initial temperature, similar installation conditions, or the like), include a heating element 104 with negligible thermal (thermo-electric) characteristic production variations, include a structure and insulation with negligible thermal characteristic production variations, and is very stable and repetitive fluid flow (e.g., geometry of fluid flow, velocity of fluid flow, or the like). The estimations may be based on a profile of power delivered, a time of operation, or other metric of the heating element 104 based on a model utilizing any modeling method. The calculational model may include at least one of a physical model of the aircraft galley insert 100, a physical model of one or more components of the aircraft galley insert 100, a mathematical model of the aircraft galley insert 100, or a mathematical model of one or more components of the aircraft galley insert 100. The estimations may or may not use any measured physical value not correlated with the heating element temperature 202. For example, the value based on at least one of the physical dependency of the heating element temperature or the mathematical dependency of the heating element temperature being used to generate the estimate of the heating element temperature may be different from the measurement of any heating element temperature.

It is noted herein, however, that monitoring to determine the heating element temperature 202 through direct or indirect measurement may be preferable to estimating the heating element temperature 202 due to the complexity of the estimations and/or the need for additional components to perform the estimation. Therefore, the above description should be interpreted as another variant of technical solution, with accordance one or more embodiments of the disclosure. In addition, this variant only describes an alternative method of determining the heating element temperature 202, instead of direct or indirect measurements.

In another embodiment, complementary to the limiting of the heating element temperature 202, a slope of the heating element temperature 202 rising with respect to time (e.g., a rise speed of the slope of heating element temperature 202) may be monitored to reduce or prevent damages caused by overheating.

A slope of the heating element temperature 202 while approaching the temperature limit threshold 702 may also be monitored to determine whether its value remains in a select range. A detection of the heating element temperature 202 slope exceeding an upper limit of select range may indicate a significantly restricted fluid flow that may be caused by abnormal operating conditions.

By detecting such abnormal conditions, the aircraft galley insert 100 may change operation mode (e.g., stop normal operation and/or trigger an internal error to request a check for fluid flow restriction. In addition, several actions to confirm motor malfunction or fan blockage may be performed by the aircraft galley insert 100 or may be requested from an operator.

Figure 10:
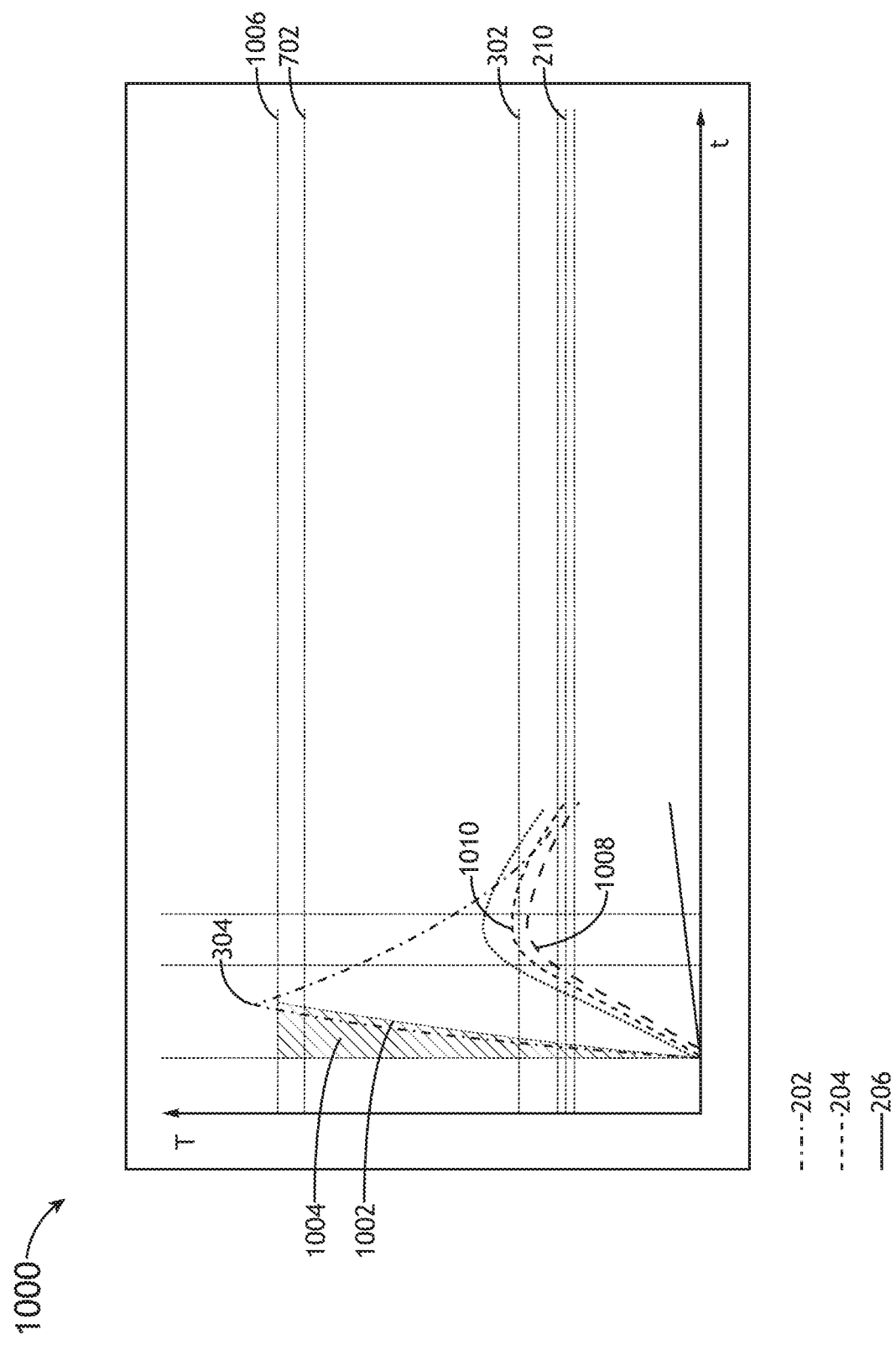
FIG. 10 is a graph of temperature versus time illustrating an operation of an aircraft galley insert, in accordance with one or more embodiments of the disclosure.

FIG. 10 illustrates a graph 1000 of a profile of a heating cycle of an aircraft galley insert 100 including a heating element temperature rise slope limit 1002, in accordance with one or more embodiments of the disclosure. In general, the graph 1000 illustrates a situation where the heating element 104 temperature 202 rises with high speed, much quicker than during normal operation of the aircraft galley insert 100, such that it is considered to be abnormal operating conditions (e.g. caused by restricted airflow). The slope of the heating element 104 temperature 202 exceeds a temperature rise slope limit 1002 and is located in an abnormal heating element temperature rise slope zone 1004.

In the graph 1000, the slope of the heating element temperature 202 located in abnormal heating element temperature rise slope zone 1004 may indicate an abnormal situation and may be used to detect such a condition.

The abnormal situation is detected by one or more slope detection components 130, and the one or more control units 116 may, based on this detection, interrupt a normal operating mode. The one or more control units 116 may be configured to cut off electrical power being delivered to the heating element 104 when such a situation is detected.

For example, the electrical power may be cut to the heating element 104 before the heating element temperature limit threshold 702 will be reached. In this example, no damage will occur (including to the safety loop components (e.g., the TCO 112), as they will not be triggered), as is illustrated with a curve 1008 representing a TCO temperature that does not exceed the TCO cut-off temperature 302.

By way of another example, the electrical power delivered to the heating element is cut off in the moment when temperature limit threshold 702 is exceeded. In this example, some safety loop components may be damaged, e.g. the TCO 112 may be tripped, as is illustrated with a curve 1010 representing a TCO temperature, but more severe damages to the aircraft galley insert 100 may not occur.

The heating element temperature 202 limiter component may cut the electrical power delivered to the heating element 104 after exceeding the fully safe heating element temperature limit threshold 702 but before exceeding a heating element temperature limit threshold 1006. The heating element temperature limit 1006 may be set higher than the temperature limit threshold 702 at a value that ensures tripping of select safety loop components (e.g. TCO 112) to indicate the issue, but is still low enough to prevent or reduce any other damages to the aircraft galley insert 100, as is illustrated with a curve 1010 representing a TCO detecting temperature that exceeds the TCO cut-off temperature 302 and cuts off electrical power to the heating element 104.

It is noted herein the heating element temperature rise slope limit threshold 1006 may be determined through estimation (e.g., via interpolation or extrapolation of any physical variable measurements or data, and/or any calculation that may be based on a physical dependency of the heating element temperature 202 or a mathematical dependency of the heating element temperature 202 (e.g. linear, polynomial, exponential or logarithmic, time and phase shifted, or the like)) in addition to or instead of direct or indirect measurement. Therefore, the above description should not be interpreted as a limitation on the disclosure but merely an illustration.

The one or more heating element temperature rise slope detection components 130 may be configured to monitor changes in the heating element temperature 202 of the heating element 104 for an abnormally steep rising slope (e.g., the slope 1002, as illustrated in FIG. 10). Based on the detected steep rising slope, an overall output signal from the one or more heating element temperature rise slope detection components 130 may be determined and/or may be used to control the heating element 104 in a way that either heating element temperature limit threshold 1006 or 702 will be not exceeded. To accomplish this, the one or more control units 116 may interrupt or even cut off electrical power to the heating element 104.

It is noted herein one or more of the heating element temperature limit threshold 702 or the heating element temperature limit threshold 1006 may be maintained by the one or more limiter components 122 being held constant during operation of the aircraft galley insert 100.

It is noted herein the slope detection component 130 may be a standalone component of an aircraft galley insert configuration or may be integrated with any other component of insert 100, including the one or more control units 116. For example, the slope detection component 130 can be both a hardware and a software component, as long as it detects a heating element temperature 202 rise slope exceeding the select threshold 1002. Therefore, the above description of example configuration of aircraft galley insert, as shown on FIG. 1C should not be interpreted as a limitation on the disclosure but merely an illustration of one of possible embodiments of the disclosure.

The one or more primary control units 124 may include circuitry or one or more circuits 126 configured to receive signals from the one or more fluid temperature monitoring components 118 (e.g., the fluid temperature 206) and transmit the signals to the one or more control unit 116. The one or more primary control units 124 may include circuitry or one or more circuits 128 configured to receive signals from the one or more temperature monitoring components 120 (e.g. the heating element temperature 202) and transmit the signals to the one or more limiter components 122 and/or one or more temperature slope detection components 130. The one or more primary control units 124 may be configured to determine a response to the received signals from the one or more control units 116, the one or more limiter components 122, and/or the one or more temperature slope detection components 130 and control the heating element 104. In one example, the one or more primary control units 124 may employ a proportional continuous signal (e.g., a pulse width modulation (PWM) signal) to control the heating element 104.

The one or more limiter components 122 and/or the one or more temperature slope detection components 130 may include circuitry configured to provide a signal (e.g., to the one or more primary control units 124 and/or to the heating element 104) when the temperature limit threshold 702 is exceeded and/or the slope 1002 exceeds a rate of increase, respectively. It is noted herein, however, that the one or more limiter components 122 and/or the one or more temperature slope detection components 130 may be configured to be activated when the temperature limit threshold 702 is exceeded and/or the rise slope limit 1002 exceeds a rate of increase, respectively. Therefore, the above description should not be interpreted as a limitation on the disclosure but merely an illustration.

The one or more primary control units 124 may be similar in build to a controller. The one or more primary control units 124 may include one or more processors and memory. The memory may store one or more sets of program instructions. The one or more processors may be configured to execute the one or more sets of program instructions to carry out one or more of the various steps described throughout the present disclosure. The one or more primary control units 124 may include one or more communication interfaces. The one or more control units 116 may include or be coupled to a user interface. The user interface may include one or more display devices. The user interface may include one or more user input devices.

It is noted herein the one or more primary control units 124 may receive signals from the one or more temperature monitoring components 120 (e.g., the heating element temperature 202) for heating cycle and/or heating profile optimization.

It is noted herein any embodiments directed to the reducing or preventing overheating through a monitoring of the heating element temperature 202 may also be directed to the reducing or preventing overheating through a monitoring of the heating element temperature rise slope limit 1002. In addition, it is noted herein any embodiments directed to the reducing or preventing overheating through a monitoring of the heating element temperature rise slope limit 1002 may also be directed to the reducing or preventing overheating through a monitoring of the heating element temperature 202.

It is noted herein that any embodiments directed to FIG. 1A may be directed to FIGS. 1B and 1C. In addition, it is noted herein that any embodiments directed to FIG. 1B may be directed to FIGS. 1C and 1A. Further, it is noted herein that any embodiments directed to FIG. 1C may be directed to FIGS. 1A and 1B. Therefore, the above description should not be interpreted as a limitation on the disclosure but merely an illustration.

Figure 11:
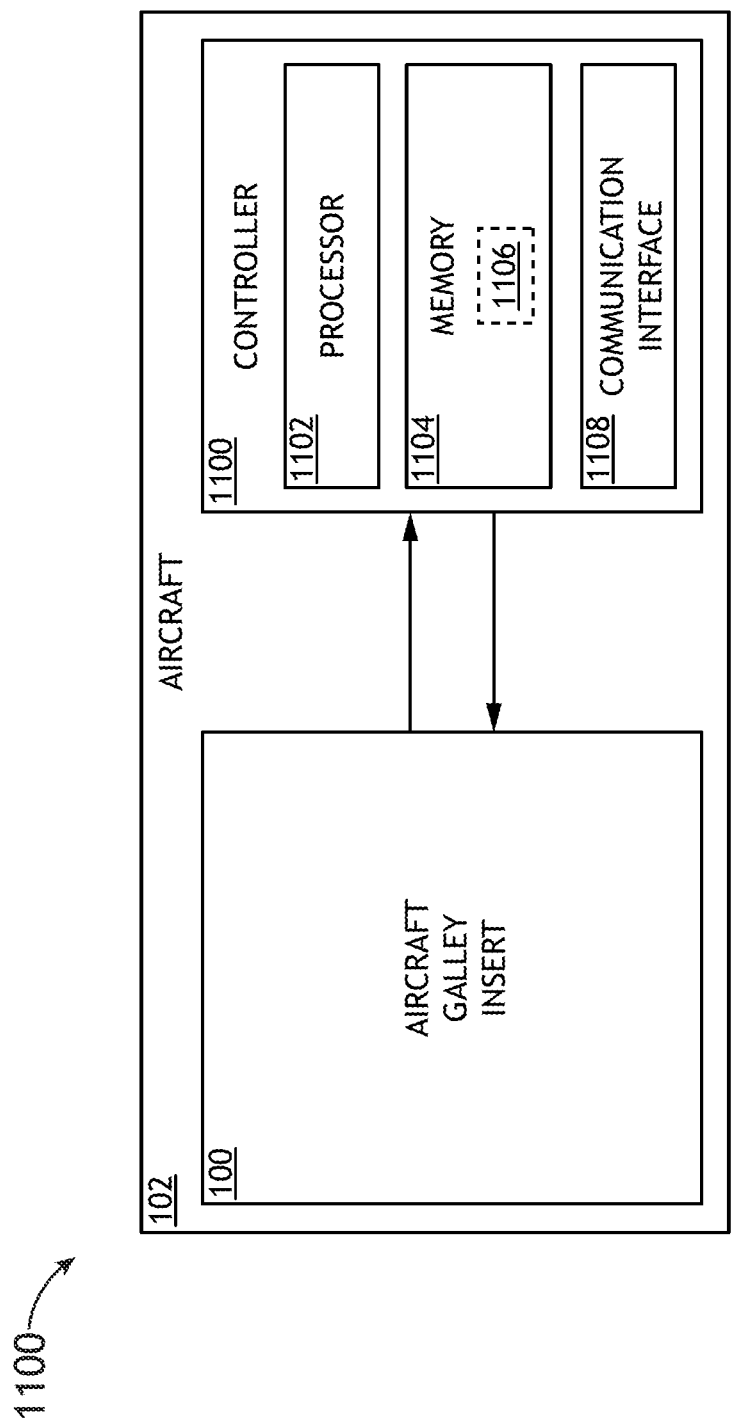
FIG. 11 is a block diagram illustrating a system including an aircraft galley insert in an aircraft, in accordance with one or more embodiments of the disclosure.

FIG. 11 illustrates a system 1100 including the aircraft galley insert 100 in the aircraft 102, in accordance with one or more embodiments of the disclosure.

The system 1100 may include one or more controllers 1102 coupled to the aircraft galley insert 100 within the aircraft 102. The one or more controllers 1102 may include one or more processors 1104 and memory 1106. The memory 1106 may store one or more sets of program instructions 1108. The one or more processors 1104 may be configured to execute the one or more sets of program instructions 1108 to carry out one or more of the various steps described throughout the present disclosure. The one or more controllers 1102 may include one or more communication interfaces 1110. The one or more controllers 1102 may include or be coupled to a user interface. The user interface may include one or more display devices. The user interface may include one or more user input devices.

The one or more controllers 1102 may monitor the temperatures of the aircraft galley insert 100 with the one or more control units 116 and/or the one or more primary control units 124 via the transmitting and receiving of temperature data. It is noted herein, however, that the one or more controllers 1102 may monitor the temperatures of the aircraft galley insert 100 instead of the one or more control units 116 and/or the one or more primary control units 124. Therefore, the above description should not be interpreted as a limitation on the disclosure but merely an illustration.

It is noted herein the aircraft galley insert 100, the one or more control units 116, the one or more primary control units 124, and/or the one or more controllers 1102 (and/or select components of the aircraft galley insert 100, the one or more control units 116, the one or more primary control units 124, and/or the one or more controllers 1102) may be configured in accordance with guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like. However, it is noted herein that the aircraft brewing apparatus 102 may not be required to meet any regulations or design definitions. Therefore, the above description should not be interpreted as a limitation on the disclosure but merely an illustration.

Although embodiments of the disclosure are directed to an aviation environment such as an aircraft, it is noted herein the systems 100, 1100 for preventing overheating in aircraft galley inserts 100 are not limited to the aviation environment and/or the aircraft components within the aviation environment, such that the systems 100, 1100 may be configured to prevent overheating in any device or apparatus configured to generate and provide heat to a product 110. For example, the systems 100, 1100 may be configured to prevent overheating in any device or apparatus configured to generate and provide heat to the product 110 and configured to operate in any type of vehicle known in the art. For instance, the vehicle may be any air, space, land, or water-based personal equipment or vehicle; any air, space, land, or water-based commercial equipment or vehicle; any air, space, land, or water-based military equipment or vehicle known in the art. Therefore, the above description should not be interpreted as a limitation on the present disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft galley insert, comprising:
   a heating element, the heating element configured to heat a fluid, the fluid configured to heat at least one of a food or drink product;
   one or more fluid temperature monitoring components, the one or more fluid temperature monitoring components configured to monitor a temperature of the fluid while the fluid is heated by the heating element, the one or more fluid temperature monitoring components configured to control the temperature of the fluid by controlling the heating element;
   one or more control units comprising one or more processors and a memory, the memory stores a set of program instructions, the one or more processors are configured to execute the set of program instructions by which the one or more control units are configured to control operation of the heating element via one or more control signals based on the temperature of the fluid monitored by the one or more fluid temperature monitoring components;

one or more heating element temperature rise slope limiters, the one or more heating element temperature rise slope limiters configured to monitor a rise speed of a heating element temperature, control the heating element to maintain the rise speed below a select heating temperature rise speed limit, and shut off the heating element when the rise speed exceeds the select heating temperature rise speed limit; and one or more heating element temperature monitoring components, the one or more heating element temperature monitoring components configured to provide information of the heating element temperature to the one or more heating element temperature rise slope limiters.

2. The aircraft galley insert of claim 1, the one or more heating element temperature monitoring components including one or more sensors, the one or more sensors including at least one of one or more sensors integrated within the heating element, one or more direct-contact temperature sensors, one or more semidirect-contact temperature sensors positioned proximate to one or more heat conducting components, one or more remote sensors installed a select distance from the heating element, or a combination of the one or more direct-contact temperature sensors, the one or more semidirect-contact temperature sensors, and the one or more remote sensors.

3. The aircraft galley insert of claim 1, the one or more heating element temperature rise slope limiters being integrated with at least one of the one or more control units or the heating element.

4. The aircraft galley insert of claim 1, the one or more heating element temperature rise slope limiters including a component separated from the one or more control units and the heating element.

5. The aircraft galley insert of claim 1, a control signal generated by the one or more heating element temperature rise slope limiters being prioritized over a control signal generated by the one or more control units based on the fluid temperature.

6. The aircraft galley insert of claim 1, the select heating element temperature rise speed limit being maintained by the one or more heating element temperature rise slope limiters, the select heating element temperature rise speed limit being held constant during operation of the aircraft galley insert.

7. The aircraft galley insert of claim 1, the select heating element temperature rise speed limit being maintained by the one or more heating element temperature rise slope limiters, the select heating element temperature rise speed limit being adjusted during operation of the aircraft galley insert based on at least one of one or more models, one or more conditions of the aircraft galley insert, or one or more user inputs.

8. The aircraft galley insert of claim 7, the one or more conditions including at least one of one or more physical conditions such as environmental conditions surrounding the aircraft galley insert, one or more modes or durations of operation, or one or more operating conditions of the galley insert such as initial operating conditions or boundary operating conditions.

9. An aircraft galley insert, comprising:
a heating element, the heating element configured to heat a fluid, the fluid configured to heat at least one of a food or drink product;

one or more fluid temperature monitoring components, the one or more fluid temperature monitoring components configured to monitor a temperature of the fluid while the fluid is heated by the heating element, the one or more fluid temperature monitoring components configured to control the fluid temperature by controlling the heating element;

one or more control units comprising one or more processors and a memory, the memory stores a set of program instructions, the one or more processors are configured to execute the set of program instructions by which the one or more control units are configured to control operation of the heating element via one or more control signals based on the temperature of the fluid monitored by the one or more fluid temperature monitoring components;

one or more heating element temperature rise slope limiters, the one or more heating element temperature rise slope limiters configured to monitor a rise speed of one or more estimated heating element temperatures and control the heating element to maintain the rise speed below a select heating temperature rise speed limit; and one or more heating element temperature estimators, the one or more heating element temperature estimators configured to provide information of one or more estimated heating element temperatures to the one or more heating element temperature rise slope limiters, the one or more heating element temperature estimators configured to estimate the one or more heating element temperatures based on a profile of power delivered to the heating element and a time of operation of the heating element.

10. The aircraft galley insert of claim 9, a control signal generated by the one or more heating element temperature rise slope limiters being prioritized over a control signal generated by the one or more control units based on the fluid temperature.

11. The aircraft galley insert of claim 9, the select heating element temperature rise speed limit being maintained by the one or more heating element temperature rise slope limiters, the select heating element temperature rise speed limit being held constant during operation of the aircraft galley insert or being adjusted during operation of the aircraft galley insert based on at least one of one or more models, one or more conditions of the aircraft galley insert, or one or more user inputs.

* * * * *